United States Patent
Dejneka et al.

(10) Patent No.: US 9,517,967 B2
(45) Date of Patent: *Dec. 13, 2016

(54) ION EXCHANGEABLE GLASS WITH HIGH DAMAGE RESISTANCE

(71) Applicant: Corning Incorporated, Corning, NY (US)

(72) Inventors: Matthew John Dejneka, Corning, NY (US); Adam James Ellison, Painted Post, NY (US); John Christopher Mauro, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/903,398

(22) Filed: May 28, 2013

(65) Prior Publication Data

US 2014/0106172 A1   Apr. 17, 2014

Related U.S. Application Data

(60) Provisional application No. 61/653,485, filed on May 31, 2012.

(51) Int. Cl.
| | | |
|---|---|---|
| *C03C 21/00* | (2006.01) | |
| *C03C 3/091* | (2006.01) | |
| *C03C 3/093* | (2006.01) | |
| *C03C 4/18* | (2006.01) | |

(52) U.S. Cl.
CPC .............. *C03C 3/093* (2013.01); *C03C 3/091* (2013.01); *C03C 4/18* (2013.01); *C03C 21/00* (2013.01); *C03C 21/002* (2013.01); *Y10T 428/315* (2015.01)

(58) Field of Classification Search
None
See application file for complete search history.

(56) References Cited

U.S. PATENT DOCUMENTS

| | | | |
|---|---|---|---|
| 3,959,000 A * | 5/1976 | Nakagawa et al. | 428/410 |
| 6,818,576 B2 | 11/2004 | Ikenishi et al. | 501/65 |
| 7,851,394 B2 | 12/2010 | Ellison | |
| 8,951,927 B2 | 2/2015 | Dejneka et al. | |
| 2009/0133441 A1* | 5/2009 | Ellison | 65/90 |
| 2009/0142568 A1 | 6/2009 | Dejneka et al. | |
| 2010/0291353 A1* | 11/2010 | Dejneka et al. | 428/192 |
| 2011/0045961 A1 | 2/2011 | Dejneka et al. | 501/66 |
| 2011/0201490 A1 | 8/2011 | Barefoot et al. | 501/66 |
| 2011/0294648 A1* | 12/2011 | Chapman et al. | 501/63 |
| 2013/0004758 A1* | 1/2013 | Dejneka et al. | 428/220 |

OTHER PUBLICATIONS

Geisinger et. al "Thermochemistry and structure of glasses along the join NaAlSi3O8-NaBSi3O8", Geochim. Cosmochim. Acta 52[10] 2405-2414 (1988).

Roy et al; "Thermochemistry of Charge-Coupled Substitutions in Silicate Glasses: The Systems Mi/nn+AlO2-SiO2 (M=Li, Na, K, Rb, Cs, Mg, Ca, Sr, Ba, Pb)", J. Amer. Ceram. Soc. 67[9]: 606-610 (1984)].

* cited by examiner

*Primary Examiner* — David Sample
(74) *Attorney, Agent, or Firm* — Timothy M. Schaeberle; Robert P. Santandrea

(57) ABSTRACT

An ion exchangeable glass having a high degree of resistance to damage caused by abrasion, scratching, indentation, and the like. The glass comprises alumina, $B_2O_3$, and alkali metal oxides, and contains boron cations having three-fold coordination. The glass, when ion exchanged, has a Vickers crack initiation threshold of at least about 30 kilogram force.

21 Claims, No Drawings

ION EXCHANGEABLE GLASS WITH HIGH DAMAGE RESISTANCE

This application claims the benefit of priority under 35 U.S.C. §119 of U.S. Provisional Application Ser. No. 61/653,485 filed on May 31, 2012 the content of which is relied upon and incorporated herein by reference in its entirety.

BACKGROUND

The disclosure relates to glasses that are capable of chemical strengthening by ion exchange and have intrinsic damage resistance. More particularly, the disclosure relates to such glasses that are strengthened by ion exchange and possess resistance to damage by abrasion, scratching, indentation, and other forms of sharp contact.

The ion exchange process provides a substantial improvement of glasses that are capable of being strengthened by this process to resist damage by sharp impact or indentation. To date, glasses containing network modifiers such as alkali and alkaline earth cations have been used. These cations form non-bridging oxygens (oxygens bonded to only one silicon atom), which reduce the resistance of the ion exchanged glass to damage introduced by abrasion, scratching, or the like.

SUMMARY

The present disclosure provides an ion exchangeable glass having a high degree of resistance to damage caused by abrasion, scratching, indentation, and the like. The glass comprises alumina, $B_2O_3$, and alkali metal oxides, and contains boron cations having three-fold coordination. The glass, when ion exchanged, has a Vickers crack initiation threshold of at least about 30 kilogram force (kgf).

Accordingly, one aspect of the disclosure is to provide an ion exchangeable glass comprising at least about 50 mol % $SiO_2$; at least about 10 mol % $R_2O$, wherein $R_2O$ comprises $Na_2O$; $Al_2O_3$, wherein $-0.5$ mol % $\leq Al_2O_3$ (mol %)$-R_2O$ (mol %)$\leq 2$ mol %; and $B_2O_3$, and wherein $B_2O_3$ (mol %)$-(R_2O$(mol %)$-Al_2O_3$ (mol %))$\geq 4.5$ mol %.

A second aspect of the disclosure is to provide a glass comprising at least about 50 mol % $SiO_2$; at least about 10 mol % $R_2O$, wherein $R_2O$ comprises $Na_2O$; $Al_2O_3$; and $B_2O_3$, wherein $B_2O_3$ (mol %)$-(R_2O$(mol %)$-Al_2O_3$ (mol %))$\geq 4.5$ mol %, and wherein the glass has a zircon breakdown temperature that is equal to the temperature at which the glass has a viscosity of greater than about 40 kPoise.

A third aspect of the disclosure is to provide an ion exchanged glass having a Vickers crack initiation threshold of at least about 30 kgf. The glass comprises at least about 50 mol % $SiO_2$; at least about 10 mol % $R_2O$, wherein $R_2O$ comprises $Na_2O$; $Al_2O_3$, wherein $-0.5$ mol % $\leq Al_2O_3$ (mol %)$-R_2O$(mol %)$\leq 2$ mol %; and $B_2O_3$, wherein $B_2O_3$ (mol %)$-(R_2O$(mol %)$-Al_2O_3$ (mol %))$\geq 4.5$ mol %.

These and other aspects, advantages, and salient features will become apparent from the following detailed description and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise specified, all compositions and concentrations described herein are expressed in mole percent (mol %). It is understood that the compositional ranges described and claimed herein represent the bulk composition of the glass as determined by those means skilled in the art, and are applicable to both the unstrengthened and strengthened glasses described herein.

Accordingly, a glass having intrinsic damage resistance is provided. In one aspect, the glass, which may be strengthened so as to be resistant to damage via sharp impact, comprises at least about 50 mol % $SiO_2$; at least about 10 mol % of at least one alkali metal oxide $R_2O$, wherein $R_2O$ includes $Na_2O$ and, optionally, other alkali metal oxides (e.g., $Li_2O$, $K_2O$, $Ce_2O$, $Rb_2O$); alumina ($Al_2O_3$), wherein $-0.5$ mol % $\leq Al_2O_3$ (mol %)$-R_2O$(mol %)$\leq 2$ mol %; and boron oxide ($B_2O_3$), wherein $B_2O_3$ (mol %)$-(R_2O$(mol %)$-Al_2O_3$ (mol %))$\geq 4.5$ mol %.

In another aspect, the glass comprises at least about 50 mol % $SiO_2$; $Al_2O_3$; $B_2O_3$; and at least about 10 mol % $R_2O$, wherein $R_2O$ comprises $Na_2O$; wherein $B_2O_3-(R_2O-Al_2O_3)\geq 4.5$ mol %, and wherein the glass has a zircon breakdown temperature (i.e., the temperature at which zircon breaks down to form zirconia and silica) equal to the temperature at which the viscosity of the glass is greater than about 40 kPoise.

In some aspects, the glasses described herein are ion exchangeable; i.e., cations—typically monovalent alkali metal cations—which are present in these glasses are replaced with larger cations—typically monovalent alkali metal cations, although other cations such as $Ag^+$ or $Tl^+$—having the same valence or oxidation state. The replacement of smaller cations with larger cations creates a surface layer that is under compression, or compressive stress CS. This layer extends from the surface into the interior or bulk of the glass to a depth of layer DOL. The compressive stress in the surface layers of the glass are balanced by a tensile stress, or central tension CT, in the interior or inner region of the glass. Compressive stress and depth of layer are measured using those means known in the art. Such means include, but are not limited to measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the stress-induced birefringence of the glass. SOC in turn is measured by those methods that are known in the art, such as fiber and four point bend method, both of which are described in ASTM standard C770-98 (2008), entitled "Standard Test Method for Measurement of Glass Stress-Optical Coefficient," the contents of which are incorporated herein by reference in their entirety, and a bulk cylinder method.

In other aspects, the glasses described herein are ion exchanged and have surfaces layers under compression to a depth of layer and an inner region that is under a tensile stress, as described hereinabove. In one aspect, the ion exchanged glass comprises at least about 50 mol % $SiO_2$; $Al_2O_3$; $B_2O_3$; and at least about 10 mol % $R_2O$, wherein $R_2O$ comprises $Na_2O$; and wherein $-0.5$ mol % $\leq Al_2O_3$ (mol %)$-R_2O$(mol %)$\leq 2$ mol % and $B_2O_3$ (mol %)$-(R_2O$(mol %)$-Al_2O_3$ (mol %))$\geq 4.5$ mol %. The ion exchanged glass has a Vickers crack initiation threshold of at least about 30 kilogram force (kgf).

When present in boroaluminosilicate glasses, alkali metals act as charge-balancing cations for tetrahedrally coordinated aluminum and boron. Species similar to $RAlO_2$ or $RBO_2$, where R is an alkali metal and aluminum are $Al^{3+}$ and $B^{3+}$, for example, are four-fold coordinated by oxygen. The four oxygen atoms surrounding aluminum or boron are presumed to bond to silicon atoms. Each oxygen therefore obtains one electron from the silicon atoms and, in effect, ¾ of an electron, from the tetrahedrally coordinated $Al^{3+}$ or $B^{3+}$. An alkali metal donates an electron to this configuration, thus allowing all four oxygens in the tetrahedron to obtain a full electron shell. The large alkaline earth elements Ca, Sr, and Ba are known to fill this role for aluminum. Thus, in a boroaluminosilicate glass in which $R_2O$(mol %)+CaO (mol %)+SrO(mol %)+BaO(mol %)$-Al_2O_3$ (mol %)$-B_2O_3$ (mol %)$=0$ mol % or, alternatively, ($Al_2O_3$ (mol %)+$B_2O_3$ (mol %))/($R_2O$(mol %)+CaO(mol %)+SrO(mol %)+BaO (mol %))$=1$, there are exactly as many electrons to be donated from alkalis and alkaline earths as there are tetrahedrally coordinated aluminum and boron atoms in need of charge balance. When $R_2O$(mol %)+CaO(mol %)+SrO(mol %)+BaO(mol %)$-Al_2O_3$ (mol %)$-B_2O_3$ (mol %)$<0$ (mol %), there are more aluminum and boron atoms in need of charge balance than electrons available from charge-balancing alkali or alkaline earth cations. Such glasses generally have high intrinsic damage resistance, which is considerably enhanced after ion exchange.

Aluminum is nearly always four-fold coordinated by oxygen if there are enough charge-balancing cations available, large. Low-valence cations perform better in a charge-balancing role than small, higher valence cations. This has been attributed to the extent to which the charge-balancing cation competes with aluminum for electron density. Large, low-valence cations are ineffective in this competition and thus leave electron density largely within the $AlO_4$ tetrahedron. Boron is mostly four-fold coordinated in annealed alkali borosilicate glasses in which the amount of alkali metals present in the glass is greater than that of boron. In annealed boroaluminosilicate glasses, however, boron assumes a mix of three and four-fold coordination, even in charge-balanced compositions. In glasses along the mixing line between 12.5$Na_2O$-12.5$Al_2O_3$-75$SiO_2$ and 12.5$Na_2O$-12.5$B_2O_3$-75$SiO_2$, for example, boron adopts a mix of three- and four-fold coordination. To a reasonable approximation, then, charge-balancing cations first stabilize aluminum in four-fold coordination, and the remaining cations will stabilize some fraction of boron in four-fold coordination, where the fraction may be as high as 1. The glasses described herein comprise greater than about 4.5 mol % $B_2O_3$ in which the boron cations are three-fold coordinated.

When $R_2O$(mol %)+MO(mol %)<$Al_2O_3$ (mol %), where MO represent divalent metal oxides (e.g., MgO, ZnO, CaO, BaO, SrO, etc.), there are not enough monovalent or divalent cations to stabilize aluminum in four-fold coordination, and boron is therefore almost entirely in three-fold coordination in these glasses. Three-fold coordinated boron is desirable because it can potentially increase to four-fold coordination when compressed, thus providing damage resistance to the glass. Glasses with compositions in which $M_2O$(mol %)+RO(mol %)$-Al_2O_3$ (mol %)<0 mol %, however, generally have very high melting temperatures unless they also have very high $B_2O_3$ contents, e.g., greater than about 10 mol %. Such high amounts of $B_2O_3$ have a deleterious effect on both the surface compressive stress and rate of ion exchange, as evidenced by low depths of layer obtained in an ion exchange of fixed duration/time period. Since high CS (e.g., greater than about 650 MPa) and significant depth of layer (DOL) (e.g., greater than 30 μm) are also required to obtain good damage resistance, the additional benefits of high intrinsic damage resistance may be offset by poor ion exchange characteristics. In order to achieve the optimal balance of attributes after ion exchange, it is therefore desirable to keep boron concentrations low. Accordingly, in some embodiments, the glasses described herein comprise less than 10 mol % $B_2O_3$. Such glasses are very difficult to melt to a level of quality (e.g., defect concentration) acceptable for mass manufacturing. Depending on the application for the glass article, a marginally acceptable defect level in a continuous process is about one inclusion greater than 100 μm in diameter per kilogram (kg) of glass.

In some embodiments, the glasses described herein comprise at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein 0≤MgO+ZnO≤6; and, optionally, at least one of CaO, BaO, and SrO, wherein 0 mol %≤CaO+SrO+BaO≤2 mol %. In some embodiments, the glasses described herein comprise from about 66 to 74 mol % $SiO_2$.

In some embodiments, the glasses described herein comprise at least about 0.1 mol % of at least one of MgO and ZnO. In certain embodiments, the glass may comprise up to about 6 mol % MgO and/or ZnO. Magnesium and zinc behave differently from the other divalent cations. While magnesium and zinc may charge-balance aluminum to some extent, they appear to have little or no role in stabilizing boron in four-fold coordination. Thus, replacing an alkali oxide with magnesium oxide in a boroaluminosilicate glass forces boron atoms out of four-fold coordination and into three-fold coordination, resulting in higher Vickers crack initiation threshold loads in ion-exchanged glass.

In addition to the oxides listed above, the glasses described herein may further comprise chemical fining agents including, but not limited to, halogens or halides (compounds containing F, Cl, Br and I) and at least one of the oxides $As_2O_3$, $Sb_2O_3$, $CeO_2$ and $SnO_2$. These fining agents, when present, are generally batched in to the raw material at a level of about 0.5 mol % or less, and have minor impact on both the rate of ion exchange and the compressive stress that are ultimately obtained.

In addition, other oxides may be added at low concentrations with little or no impact on the ion exchange characteristics of these glasses. Examples of such oxides include $ZrO_2$, which is a common contaminant introduced by zirconia refractories in melters; $TiO_2$, which is a common tramp component of natural silica sources; $Fe_2O_3$, which is an ubiquitous tramp oxide in all but the purest chemical reagents; and other transition metal oxides that may be used to introduce color. These transition metal oxides include $V_2O_5$, $Cr_2O_3$, $Co_3O_4$, $Fe_2O_3$, $MnO_2$, NiO, CuO, $Cu_2O$, and the like. Concentrations of these oxides, when present in the glass, are kept at levels of less than or equal to about 2 mol %. Compared to calcium, larger alkaline earths such as Sr and Ba lead to lower diffusivity and thus significantly lower depth of the compressive layer. Because Sr and Ba are costly reagents compared to most of the other oxides in the glasses described herein the concentrations of these materials, when present in the glass, are kept at levels of no more than about 0.5 mol %. Rubidium and cesium oxides are too large to ion exchange at an appreciable rate, are costly, and contribute to high liquidus temperatures at elevated concentrations. The concentrations of these oxides are therefore kept below 0.5 mol %. Lithium oxide is to be generally avoided, as it contributes to "poisoning" of potassium nitrate salt ion exchange baths, resulting in lower compressive stress than if the same glass were ion exchanged in a lithium-free salt bath. In addition, compared to a sodium-for-potassium exchange, the presence of lithium leads to significantly reduced diffusivity when exchanging for potassium. When present in the glass, the lithium oxide concentration should therefore be kept below about 0.5 mol %, and, in some embodiments, below about 0.1 mol %. In some embodiments, the glasses described herein are substantially free of lithium.

Non-limiting examples of the glasses described herein are listed in Table 1. Table 2 lists selected properties, including strain, anneal, and softening temperatures, coefficients of thermal expansion (CTE), density, Poisson ratio, shear moduli, Young's moduli, stress optical coefficients (SOC), and refractive indices, of the samples listed in Table 1

As used herein, the term "zircon breakdown temperature" or "$T^{breakdown}$" refers to the temperature at which zircon—which is commonly used as a refractory material in glass processing and manufacture—breaks down to form zirconia and silica. In isoviscous processes such as fusion, the highest temperature experienced by the glass corresponds to a particular viscosity of the glass. For example, "$T^{35kP}$" refers to the temperature at which the glass has a viscosity of 35 kilopoise (kPoise). The difference between the breakdown temperature and the temperature corresponding to 35,000 poise viscosity is defined as the breakdown margin $T^{margin}$, where: $T^{margin} = T^{breakdown} - T^{35kp}$. When the breakdown margin $T^{margin}$ is negative, zircon will breakdown to form zirconia defects at some location on the isopipe. When $T^{margin}$ is zero, it is still possible that temperature excursions could cause zircon breakdown to occur. It is therefore desirable not only to make the breakdown margin positive, but to maximize $T^{margin}$ as much as possible while being consistent with all the other attributes that must be maintained in the final glass product. In some embodiments, the glasses described herein have a zircon breakdown temperature that is greater than 40 kPoise and, in some embodiments, about 70 kPoise.

In those embodiments in which the glass is strengthened by ion exchange, the glass may, in some embodiments, be ion exchanged to create a surface layer that is under a compressive stress of at least about 600 megapascals (MPa) and, in other embodiments, at least about 800 MPa. The compressive surface layer has a depth of layer of at least about 30 microns (μm). The ion exchanged glasses described herein also possess a degree of intrinsic damage resistance (IDR), which may be characterized by the Vickers crack initiation threshold of the ion exchanged glass. In some embodiments, the ion exchanged glass has a Vickers crack initiation threshold in a range from about 30 kgf to about 35 kgf. The Vickers crack initiation threshold measurements described herein are performed by applying and then removing an indentation load to the glass surface at a rate of 0.2 mm/min. The maximum indentation load is held for 10 seconds. The crack initiation threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

When ion exchanged, the glasses described herein have a compressive stress that is sufficiently high to provide outstanding damage resistance against impact of various kinds. The glasses described herein may be ion exchanged at a rate that facilitates large scale manufacturing. While it is advantageous to provide high compressive stress by annealing the glass prior to ion exchange, a high compressive stress may also be obtained by instead cooling the glass rapidly from a high temperature (e.g., above the strain point of the glass). Such rapid cooling may occur, for example, in down drawn processes such as fusion or slot draw processes. The combination of compressive stress, depth of layer, and intrinsic damage resistance of the ion exchanged glasses described herein provides excellent resistance to visible or strength-limiting damage introduced via sharp contact and scratching.

Table 3 lists compressive stresses, depths of layer (DOL), and indentation thresholds for samples listed in Table 1 that were ion exchanged.

TABLE 1

| | Composition (mol %) | | | | | | | | |
|---|---|---|---|---|---|---|---|---|---|
| Example | $SiO_2$ | $Al_2O_3$ | $B_2O_3$ | $Na_2O$ | $K_2O$ | MgO | CaO | ZnO | $SnO_2$ |
| 1 | 64.85 | 13.01 | 6.81 | 13.09 | 0.51 | 1.53 | 0.08 | 0.00 | 0.10 |
| 2 | 64.92 | 12.88 | 6.57 | 12.90 | 0.51 | 2.04 | 0.08 | 0.00 | 0.10 |
| 3 | 64.93 | 12.70 | 6.47 | 12.69 | 0.51 | 2.52 | 0.08 | 0.00 | 0.10 |

TABLE 1-continued

| | Composition (mol %) | | | | | | | | |
|---|---|---|---|---|---|---|---|---|---|
| Example | SiO$_2$ | Al$_2$O$_3$ | B$_2$O$_3$ | Na$_2$O | K$_2$O | MgO | CaO | ZnO | SnO$_2$ |
| 4 | 64.94 | 12.50 | 6.30 | 12.51 | 0.51 | 3.04 | 0.09 | 0.00 | 0.10 |
| 5 | 65.10 | 13.01 | 6.39 | 12.28 | 0.51 | 2.52 | 0.08 | 0.00 | 0.10 |
| 6 | 65.16 | 13.47 | 6.39 | 11.73 | 0.51 | 2.55 | 0.08 | 0.00 | 0.10 |
| 7 | 65.08 | 13.22 | 6.31 | 13.19 | 0.51 | 1.50 | 0.08 | 0.00 | 0.10 |
| 8 | 65.13 | 13.10 | 6.07 | 12.97 | 0.51 | 2.03 | 0.08 | 0.00 | 0.10 |
| 9 | 65.08 | 12.96 | 5.78 | 13.00 | 0.51 | 2.49 | 0.09 | 0.00 | 0.10 |
| 10 | 65.24 | 12.91 | 5.47 | 12.67 | 0.51 | 3.01 | 0.09 | 0.00 | 0.10 |
| 11 | 64.78 | 12.87 | 5.55 | 13.11 | 0.51 | 2.08 | 1.00 | 0.00 | 0.10 |
| 12 | 51.33 | 20.21 | 7.03 | 19.17 | 0.97 | 1.03 | 0.13 | 0.00 | 0.10 |
| 13 | 65.10 | 13.15 | 5.95 | 14.60 | 0.50 | 0.50 | 0.07 | 0.00 | 0.10 |
| 14 | 64.71 | 13.14 | 5.98 | 14.47 | 0.50 | 0.99 | 0.07 | 0.00 | 0.10 |
| 15 | 64.05 | 13.18 | 5.97 | 14.60 | 0.50 | 1.51 | 0.08 | 0.00 | 0.10 |
| 16 | 63.65 | 13.16 | 5.97 | 14.51 | 0.49 | 2.00 | 0.08 | 0.00 | 0.10 |
| 17 | 63.17 | 13.16 | 5.96 | 14.50 | 0.49 | 2.50 | 0.08 | 0.00 | 0.10 |
| 18 | 57.52 | 17.04 | 5.58 | 18.17 | 0.49 | 0.99 | 0.08 | 0.00 | 0.10 |
| 19 | 57.53 | 17.00 | 5.58 | 18.16 | 0.49 | 1.02 | 0.08 | 0.00 | 0.10 |
| 20 | 63.39 | 14.04 | 7.02 | 13.84 | 0.50 | 1.03 | 0.07 | 0.00 | 0.10 |
| 21 | 64.38 | 13.01 | 7.06 | 13.83 | 0.50 | 1.03 | 0.07 | 0.00 | 0.10 |
| 22 | 64.48 | 14.03 | 5.97 | 13.81 | 0.50 | 1.03 | 0.07 | 0.00 | 0.10 |
| 23 | 64.57 | 14.03 | 7.00 | 12.71 | 0.49 | 1.01 | 0.07 | 0.00 | 0.10 |
| 24 | 64.47 | 14.01 | 7.01 | 13.78 | 0.00 | 0.53 | 0.07 | 0.00 | 0.10 |
| 25 | 64.37 | 12.00 | 7.12 | 13.80 | 0.49 | 2.04 | 0.07 | 0.00 | 0.10 |
| 26 | 63.39 | 14.00 | 6.91 | 14.08 | 0.51 | 0.01 | 0.06 | 0.92 | 0.10 |
| 27 | 64.22 | 12.98 | 7.03 | 14.16 | 0.52 | 0.01 | 0.06 | 0.90 | 0.10 |
| 28 | 64.34 | 14.00 | 5.99 | 14.06 | 0.51 | 0.01 | 0.06 | 0.91 | 0.10 |
| 29 | 64.27 | 13.94 | 7.04 | 13.12 | 0.52 | 0.01 | 0.06 | 0.92 | 0.10 |
| 30 | 64.37 | 13.96 | 7.02 | 13.97 | 0.01 | 0.01 | 0.06 | 0.48 | 0.10 |
| 31 | 64.28 | 11.99 | 7.04 | 14.21 | 0.50 | 0.01 | 0.06 | 1.79 | 0.10 |
| 32 | 67.18 | 12.78 | 5.65 | 13.70 | 0.00 | 0.54 | 0.02 | 0.00 | 0.10 |
| 33 | 65.52 | 13.59 | 5.62 | 14.25 | 0.10 | 0.77 | 0.04 | 0.00 | 0.10 |
| 34 | 65.61 | 13.58 | 5.59 | 14.21 | 0.10 | 0.76 | 0.04 | 0.00 | 0.10 |
| 35 | 65.74 | 13.57 | 5.63 | 14.05 | 0.10 | 0.77 | 0.04 | 0.00 | 0.10 |
| 36 | 65.71 | 13.57 | 5.74 | 13.97 | 0.10 | 0.76 | 0.04 | 0.00 | 0.10 |
| 37 | 65.86 | 13.56 | 5.25 | 14.32 | 0.10 | 0.76 | 0.04 | 0.00 | 0.10 |
| 38 | 65.83 | 13.59 | 5.12 | 14.45 | 0.10 | 0.77 | 0.05 | 0.00 | 0.10 |
| 39 | 64.53 | 13.99 | 6.60 | 13.71 | 0.50 | 0.49 | 0.06 | 0.00 | 0.10 |
| 40 | 64.32 | 14.00 | 6.15 | 13.82 | 0.51 | 1.01 | 0.06 | 0.00 | 0.10 |
| 41 | 64.76 | 13.97 | 5.57 | 13.56 | 0.50 | 1.45 | 0.06 | 0.00 | 0.10 |
| 42 | 64.53 | 13.98 | 5.06 | 13.74 | 0.51 | 2.00 | 0.06 | 0.00 | 0.10 |
| 43 | 64.33 | 14.01 | 4.58 | 13.82 | 0.51 | 2.57 | 0.06 | 0.00 | 0.10 |
| 44 | 64.34 | 14.72 | 6.18 | 13.43 | 0.20 | 1.01 | 0.02 | 0.00 | 0.07 |
| 45 | 64.21 | 14.68 | 5.73 | 13.51 | 0.20 | 1.54 | 0.03 | 0.00 | 0.07 |
| 46 | 64.11 | 14.71 | 5.22 | 13.55 | 0.20 | 2.10 | 0.03 | 0.00 | 0.07 |
| 47 | 63.98 | 14.65 | 4.65 | 13.71 | 0.21 | 2.68 | 0.03 | 0.00 | 0.07 |
| 48 | 64.09 | 14.61 | 4.15 | 13.61 | 0.21 | 3.20 | 0.03 | 0.00 | 0.07 |
| 49 | 66.46 | 14.20 | 5.13 | 11.89 | 0.20 | 2.01 | 0.03 | 0.00 | 0.07 |
| 50 | 66.40 | 13.96 | 5.13 | 12.16 | 0.20 | 2.03 | 0.03 | 0.00 | 0.07 |
| 51 | 66.44 | 13.69 | 5.15 | 12.37 | 0.20 | 2.03 | 0.02 | 0.00 | 0.07 |
| 52 | 66.44 | 13.46 | 5.15 | 12.63 | 0.20 | 2.01 | 0.03 | 0.00 | 0.07 |
| 53 | 66.42 | 13.04 | 5.11 | 13.10 | 0.20 | 2.01 | 0.03 | 0.00 | 0.07 |
| 54 | 66.45 | 13.10 | 5.11 | 13.00 | 0.20 | 2.01 | 0.03 | 0.00 | 0.07 |
| 55 | 64.53 | 13.91 | 6.61 | 13.72 | 0.10 | 1.02 | 0.02 | 0.00 | 0.07 |
| 56 | 64.48 | 13.96 | 6.04 | 13.21 | 0.10 | 2.10 | 0.03 | 0.00 | 0.07 |
| 57 | 64.29 | 13.91 | 5.64 | 12.79 | 0.10 | 3.15 | 0.03 | 0.00 | 0.07 |
| 58 | 64.11 | 13.87 | 5.10 | 12.42 | 0.10 | 4.27 | 0.04 | 0.00 | 0.07 |
| 59 | 64.41 | 13.86 | 4.57 | 11.77 | 0.10 | 5.14 | 0.05 | 0.00 | 0.07 |
| 60 | 65.76 | 13.87 | 5.15 | 13.91 | 0.11 | 1.08 | 0.03 | 0.00 | 0.07 |
| 61 | 65.71 | 13.90 | 5.15 | 13.42 | 0.11 | 1.60 | 0.04 | 0.00 | 0.07 |
| 62 | 65.74 | 13.87 | 5.08 | 12.94 | 0.11 | 2.13 | 0.04 | 0.00 | 0.07 |
| 63 | 65.87 | 13.89 | 5.09 | 12.32 | 0.11 | 2.60 | 0.04 | 0.00 | 0.07 |
| 64 | 65.93 | 13.93 | 5.05 | 11.77 | 0.11 | 3.08 | 0.05 | 0.00 | 0.07 |
| 65 | 64.31 | 14.72 | 4.06 | 13.45 | 0.20 | 3.13 | 0.04 | 0.00 | 0.07 |
| 66 | 64.44 | 14.73 | 3.51 | 13.39 | 0.20 | 3.61 | 0.04 | 0.00 | 0.07 |
| 67 | 64.36 | 14.76 | 3.05 | 13.39 | 0.20 | 4.12 | 0.04 | 0.00 | 0.07 |
| 68 | 67.78 | 13.46 | 3.46 | 12.28 | 0.10 | 2.79 | 0.04 | 0.00 | 0.07 |
| 69 | 67.63 | 13.22 | 3.45 | 12.61 | 0.10 | 2.87 | 0.04 | 0.00 | 0.07 |
| 70 | 67.77 | 13.01 | 3.49 | 12.74 | 0.10 | 2.76 | 0.04 | 0.00 | 0.07 |
| 71 | 57.32 | 19.10 | 4.37 | 17.73 | 0.25 | 1.06 | 0.05 | 0.00 | 0.10 |
| 72 | 57.42 | 18.59 | 5.35 | 17.17 | 0.26 | 1.06 | 0.05 | 0.00 | 0.10 |
| 73 | 67.20 | 12.08 | 2.54 | 14.18 | 0.00 | 3.80 | 0.05 | 0.00 | 0.10 |
| 74 | 66.34 | 12.71 | 3.57 | 13.94 | 0.00 | 3.28 | 0.05 | 0.00 | 0.09 |
| 75 | 65.10 | 13.70 | 4.91 | 13.72 | 0.00 | 2.48 | 0.04 | 0.00 | 0.08 |
| 76 | 65.13 | 13.77 | 4.93 | 13.68 | 0.00 | 2.41 | 0.04 | 0.00 | 0.08 |
| 77 | 64.88 | 13.87 | 5.20 | 13.65 | 0.00 | 2.32 | 0.04 | 0.00 | 0.08 |
| 78 | 64.91 | 13.88 | 5.15 | 13.61 | 0.00 | 2.32 | 0.05 | 0.00 | 0.08 |
| 79 | 64.88 | 13.90 | 5.25 | 13.59 | 0.00 | 2.30 | 0.04 | 0.00 | 0.08 |

TABLE 1-continued

| | Composition (mol %) | | | | | | | | |
|---|---|---|---|---|---|---|---|---|---|
| Example | SiO$_2$ | Al$_2$O$_3$ | B$_2$O$_3$ | Na$_2$O | K$_2$O | MgO | CaO | ZnO | SnO$_2$ |
| 80 | 64.81 | 13.91 | 5.22 | 13.68 | 0.00 | 2.31 | 0.04 | 0.00 | 0.08 |
| 81 | 64.65 | 13.93 | 5.11 | 13.75 | 0.00 | 2.38 | 0.14 | 0.00 | 0.08 |
| 82 | 64.74 | 13.98 | 4.48 | 14.21 | 0.00 | 2.45 | 0.08 | 0.00 | 0.08 |
| 83 | 64.74 | 14.04 | 3.90 | 14.61 | 0.00 | 2.54 | 0.08 | 0.00 | 0.08 |
| 84 | 64.66 | 14.02 | 3.78 | 14.80 | 0.00 | 2.56 | 0.09 | 0.00 | 0.08 |
| 85 | 64.63 | 14.02 | 3.75 | 14.87 | 0.00 | 2.58 | 0.05 | 0.00 | 0.08 |
| 86 | 64.47 | 14.02 | 3.84 | 14.56 | 0.00 | 2.98 | 0.05 | 0.00 | 0.08 |
| 87 | 64.73 | 14.03 | 3.67 | 13.89 | 0.00 | 3.55 | 0.05 | 0.00 | 0.07 |
| 88 | 64.68 | 14.02 | 3.75 | 13.68 | 0.00 | 3.74 | 0.05 | 0.00 | 0.08 |
| 89 | 64.67 | 14.01 | 3.80 | 13.55 | 0.00 | 3.83 | 0.05 | 0.00 | 0.08 |
| 90 | 64.82 | 14.02 | 3.65 | 13.54 | 0.00 | 3.83 | 0.05 | 0.00 | 0.09 |
| 91 | 64.72 | 14.01 | 3.70 | 13.49 | 0.00 | 3.93 | 0.05 | 0.00 | 0.08 |
| 92 | 64.71 | 13.99 | 3.78 | 13.73 | 0.00 | 3.67 | 0.05 | 0.00 | 0.07 |
| 93 | 64.87 | 13.97 | 3.78 | 13.84 | 0.00 | 3.41 | 0.04 | 0.00 | 0.08 |
| 94 | 64.83 | 13.95 | 3.92 | 14.09 | 0.00 | 3.09 | 0.04 | 0.00 | 0.08 |
| 95 | 64.75 | 13.99 | 3.97 | 14.15 | 0.00 | 3.01 | 0.04 | 0.00 | 0.08 |
| 96 | 64.66 | 13.98 | 4.09 | 14.15 | 0.00 | 2.99 | 0.04 | 0.00 | 0.08 |
| 97 | 64.81 | 13.99 | 3.96 | 14.14 | 0.00 | 2.97 | 0.04 | 0.00 | 0.08 |
| 98 | 65.02 | 13.81 | 4.10 | 13.99 | 0.00 | 2.97 | 0.04 | 0.00 | 0.08 |
| 99 | 65.97 | 13.49 | 3.82 | 13.69 | 0.00 | 2.90 | 0.04 | 0.00 | 0.07 |
| 100 | 66.55 | 13.18 | 3.86 | 13.48 | 0.00 | 2.81 | 0.04 | 0.00 | 0.07 |
| 101 | 66.87 | 13.08 | 3.83 | 13.31 | 0.00 | 2.79 | 0.04 | 0.00 | 0.07 |
| 102 | 67.04 | 13.07 | 3.72 | 13.26 | 0.00 | 2.79 | 0.04 | 0.00 | 0.07 |
| 103 | 66.93 | 13.06 | 3.73 | 13.26 | 0.00 | 2.90 | 0.04 | 0.00 | 0.07 |
| 104 | 66.63 | 12.96 | 3.58 | 13.09 | 0.00 | 3.62 | 0.04 | 0.00 | 0.07 |
| 105 | 66.10 | 12.86 | 3.46 | 12.89 | 0.00 | 4.54 | 0.05 | 0.00 | 0.08 |
| 106 | 65.83 | 12.81 | 3.46 | 12.92 | 0.00 | 4.84 | 0.05 | 0.00 | 0.07 |
| 107 | 65.95 | 12.80 | 3.36 | 12.81 | 0.00 | 4.94 | 0.05 | 0.00 | 0.07 |
| 108 | 65.98 | 12.80 | 3.28 | 12.82 | 0.00 | 4.97 | 0.05 | 0.00 | 0.07 |
| 109 | 65.82 | 12.84 | 3.54 | 12.94 | 0.00 | 4.73 | 0.05 | 0.00 | 0.08 |
| 110 | 64.57 | 13.21 | 4.72 | 13.43 | 0.00 | 3.97 | 0.05 | 0.00 | 0.08 |
| 111 | 64.27 | 13.61 | 5.54 | 13.40 | 0.00 | 3.12 | 0.04 | 0.00 | 0.09 |
| 112 | 63.64 | 13.87 | 6.15 | 13.71 | 0.00 | 2.60 | 0.04 | 0.00 | 0.08 |
| 113 | 63.16 | 13.75 | 6.57 | 13.82 | 0.00 | 2.56 | 0.04 | 0.00 | 0.09 |
| 114 | 63.37 | 13.84 | 6.43 | 13.79 | 0.00 | 2.54 | 0.04 | 0.00 | 0.09 |
| 115 | 63.80 | 13.76 | 6.19 | 13.67 | 0.01 | 2.54 | 0.04 | 0.00 | 0.09 |
| 116 | 65.44 | 13.63 | 5.22 | 13.11 | 0.01 | 2.52 | 0.04 | 0.00 | 0.07 |
| 117 | 67.21 | 13.41 | 4.31 | 12.46 | 0.01 | 2.49 | 0.04 | 0.00 | 0.07 |
| 118 | 68.71 | 13.27 | 3.42 | 12.02 | 0.00 | 2.46 | 0.04 | 0.00 | 0.06 |
| 119 | 68.73 | 13.23 | 3.44 | 12.01 | 0.00 | 2.46 | 0.04 | 0.00 | 0.06 |
| 120 | 68.72 | 13.29 | 3.35 | 12.07 | 0.00 | 2.45 | 0.04 | 0.00 | 0.06 |
| 121 | 68.71 | 13.25 | 3.41 | 12.05 | 0.00 | 2.46 | 0.04 | 0.00 | 0.06 |
| 122 | 67.47 | 13.34 | 3.36 | 12.45 | 0.01 | 3.25 | 0.04 | 0.00 | 0.06 |
| 123 | 65.82 | 13.42 | 3.45 | 12.99 | 0.01 | 4.20 | 0.05 | 0.00 | 0.06 |
| 124 | 64.79 | 13.49 | 3.46 | 13.35 | 0.01 | 4.78 | 0.05 | 0.00 | 0.07 |
| 125 | 64.68 | 13.52 | 3.36 | 13.41 | 0.01 | 4.88 | 0.05 | 0.00 | 0.07 |
| 126 | 64.54 | 13.50 | 3.35 | 13.46 | 0.01 | 5.01 | 0.05 | 0.00 | 0.07 |
| 127 | 64.54 | 13.47 | 3.43 | 13.43 | 0.01 | 4.99 | 0.05 | 0.00 | 0.06 |
| 128 | 65.06 | 13.41 | 3.39 | 13.65 | 0.01 | 4.35 | 0.05 | 0.00 | 0.07 |
| 129 | 65.42 | 13.32 | 3.57 | 13.93 | 0.01 | 3.63 | 0.04 | 0.00 | 0.08 |
| 130 | 65.64 | 13.20 | 3.67 | 14.46 | 0.00 | 2.91 | 0.04 | 0.00 | 0.08 |
| 131 | 65.77 | 13.17 | 3.66 | 14.51 | 0.00 | 2.77 | 0.04 | 0.00 | 0.08 |
| 132 | 65.77 | 13.17 | 3.65 | 14.54 | 0.00 | 2.74 | 0.04 | 0.00 | 0.08 |
| 133 | 65.82 | 13.18 | 3.64 | 14.50 | 0.00 | 2.72 | 0.04 | 0.00 | 0.08 |
| 134 | 66.26 | 13.32 | 3.54 | 14.09 | 0.00 | 2.66 | 0.04 | 0.00 | 0.08 |
| 135 | 66.86 | 13.54 | 3.41 | 13.47 | 0.00 | 2.57 | 0.04 | 0.00 | 0.08 |
| 136 | 67.38 | 13.74 | 3.42 | 12.82 | 0.00 | 2.50 | 0.04 | 0.00 | 0.07 |
| 137 | 67.53 | 13.77 | 3.43 | 12.68 | 0.00 | 2.47 | 0.04 | 0.00 | 0.07 |
| 138 | 67.55 | 13.79 | 3.42 | 12.64 | 0.00 | 2.47 | 0.04 | 0.00 | 0.07 |
| 139 | 67.62 | 13.79 | 3.37 | 12.64 | 0.00 | 2.45 | 0.04 | 0.00 | 0.07 |
| 140 | 67.62 | 13.68 | 3.10 | 12.83 | 0.01 | 2.64 | 0.03 | 0.00 | 0.07 |
| 141 | 67.17 | 13.42 | 3.38 | 13.02 | 0.01 | 2.89 | 0.03 | 0.00 | 0.07 |
| 142 | 66.99 | 13.24 | 3.43 | 13.13 | 0.00 | 3.08 | 0.04 | 0.00 | 0.07 |
| 143 | 67.01 | 13.21 | 3.36 | 13.17 | 0.00 | 3.12 | 0.04 | 0.00 | 0.07 |
| 144 | 67.00 | 13.22 | 3.31 | 13.18 | 0.00 | 3.16 | 0.04 | 0.00 | 0.07 |
| 145 | 66.97 | 13.26 | 3.36 | 13.19 | 0.00 | 3.10 | 0.04 | 0.00 | 0.07 |
| 146 | 66.22 | 13.62 | 3.70 | 13.59 | 0.00 | 2.74 | 0.04 | 0.00 | 0.08 |
| 147 | 64.73 | 14.33 | 4.36 | 14.40 | 0.00 | 2.09 | 0.04 | 0.00 | 0.07 |
| 148 | 63.33 | 14.99 | 4.90 | 15.16 | 0.04 | 1.51 | 0.04 | 0.00 | 0.08 |
| 149 | 62.14 | 15.58 | 5.50 | 15.76 | 0.06 | 0.92 | 0.04 | 0.00 | 0.08 |
| 150 | 60.92 | 16.47 | 5.83 | 16.40 | 0.07 | 0.29 | 0.03 | 0.00 | 0.08 |
| 151 | 60.04 | 16.54 | 6.43 | 16.71 | 0.07 | 0.11 | 0.03 | 0.00 | 0.07 |
| 152 | 65.17 | 13.40 | 6.56 | 12.77 | 1.01 | 0.87 | 0.12 | 0.00 | 0.10 |
| 153 | 65.43 | 13.23 | 5.91 | 12.33 | 1.01 | 2.13 | 0.14 | 0.00 | 0.10 |
| 154 | 65.31 | 13.09 | 5.70 | 12.10 | 1.01 | 2.55 | 0.14 | 0.00 | 0.10 |
| 155 | 66.65 | 13.03 | 5.69 | 12.32 | 1.01 | 1.06 | 0.13 | 0.00 | 0.10 |

TABLE 1-continued

| | Composition (mol %) | | | | | | | | |
|---|---|---|---|---|---|---|---|---|---|
| Example | $SiO_2$ | $Al_2O_3$ | $B_2O_3$ | $Na_2O$ | $K_2O$ | MgO | CaO | ZnO | $SnO_2$ |
| 156 | 64.65 | 13.97 | 6.05 | 14.49 | 0.28 | 0.38 | 0.06 | 0.00 | 0.11 |
| 157 | 64.63 | 13.97 | 6.20 | 14.22 | 0.28 | 0.63 | 0.06 | 0.00 | 0.10 |
| 158 | 64.67 | 13.98 | 6.05 | 13.71 | 0.28 | 1.14 | 0.06 | 0.00 | 0.10 |
| 159 | 64.70 | 13.99 | 6.11 | 13.45 | 0.28 | 1.39 | 0.06 | 0.00 | 0.10 |
| 160 | 64.65 | 13.98 | 6.09 | 13.36 | 0.28 | 1.47 | 0.06 | 0.00 | 0.10 |
| 161 | 64.64 | 13.98 | 6.19 | 13.32 | 0.28 | 1.52 | 0.07 | 0.00 | 0.10 |
| 162 | 64.70 | 13.95 | 6.04 | 13.31 | 0.28 | 1.55 | 0.07 | 0.00 | 0.10 |
| 163 | 65.20 | 14.00 | 5.58 | 13.28 | 0.28 | 1.56 | 0.07 | 0.00 | 0.10 |
| 164 | 66.04 | 14.00 | 4.73 | 13.23 | 0.28 | 1.55 | 0.07 | 0.00 | 0.10 |
| 165 | 66.05 | 14.00 | 4.69 | 13.29 | 0.28 | 1.56 | 0.06 | 0.00 | 0.11 |
| 166 | 66.13 | 13.98 | 4.60 | 13.28 | 0.28 | 1.56 | 0.06 | 0.00 | 0.10 |
| 167 | 66.16 | 13.93 | 4.70 | 13.24 | 0.28 | 1.56 | 0.06 | 0.00 | 0.10 |
| 168 | 65.84 | 13.71 | 4.83 | 13.43 | 0.21 | 1.82 | 0.06 | 0.00 | 0.10 |
| 169 | 65.83 | 13.59 | 4.92 | 13.47 | 0.18 | 1.90 | 0.05 | 0.00 | 0.11 |
| 170 | 65.62 | 13.31 | 5.05 | 13.60 | 0.09 | 2.16 | 0.04 | 0.00 | 0.11 |
| 171 | 65.60 | 13.28 | 5.09 | 13.65 | 0.08 | 2.19 | 0.04 | 0.00 | 0.12 |
| 172 | 65.57 | 13.26 | 5.08 | 13.65 | 0.07 | 2.20 | 0.04 | 0.00 | 0.12 |
| 173 | 65.43 | 13.24 | 5.13 | 13.80 | 0.07 | 2.15 | 0.04 | 0.00 | 0.12 |
| 174 | 65.42 | 13.12 | 5.23 | 14.06 | 0.07 | 2.01 | 0.04 | 0.00 | 0.11 |
| 175 | 65.59 | 12.98 | 5.11 | 14.25 | 0.07 | 1.84 | 0.04 | 0.00 | 0.11 |
| 176 | 65.69 | 12.86 | 5.20 | 14.39 | 0.07 | 1.69 | 0.04 | 0.00 | 0.11 |
| 177 | 65.84 | 12.84 | 5.03 | 14.38 | 0.07 | 1.67 | 0.04 | 0.00 | 0.12 |
| 178 | 65.58 | 12.88 | 5.24 | 14.29 | 0.07 | 1.83 | 0.04 | 0.00 | 0.12 |
| 179 | 65.66 | 12.97 | 5.11 | 13.92 | 0.07 | 2.11 | 0.04 | 0.00 | 0.11 |
| 180 | 65.56 | 13.10 | 5.16 | 13.51 | 0.07 | 2.51 | 0.04 | 0.00 | 0.11 |
| 181 | 65.52 | 13.15 | 5.15 | 13.22 | 0.07 | 2.73 | 0.04 | 0.00 | 0.11 |
| 182 | 65.50 | 13.20 | 5.15 | 13.14 | 0.07 | 2.84 | 0.05 | 0.00 | 0.11 |
| 183 | 65.53 | 13.22 | 5.12 | 13.01 | 0.07 | 2.89 | 0.05 | 0.00 | 0.11 |
| 184 | 65.32 | 13.28 | 5.17 | 13.09 | 0.07 | 2.90 | 0.05 | 0.00 | 0.11 |
| 185 | 65.14 | 13.52 | 5.25 | 13.22 | 0.07 | 2.70 | 0.04 | 0.00 | 0.11 |
| 186 | 64.91 | 13.89 | 5.11 | 13.54 | 0.07 | 2.37 | 0.04 | 0.00 | 0.10 |
| 187 | 64.75 | 13.95 | 5.15 | 13.63 | 0.07 | 2.30 | 0.04 | 0.00 | 0.10 |
| 188 | 64.83 | 13.99 | 5.15 | 13.61 | 0.07 | 2.26 | 0.04 | 0.00 | 0.10 |
| 189 | 64.72 | 14.17 | 5.36 | 12.95 | 0.01 | 2.66 | 0.04 | 0.00 | 0.09 |
| 190 | 63.56 | 14.98 | 5.44 | 13.31 | 0.01 | 2.57 | 0.04 | 0.00 | 0.09 |
| 191 | 64.29 | 14.21 | 6.21 | 14.45 | 0.01 | 0.69 | 0.03 | 0.00 | 0.10 |
| 192 | 64.08 | 14.42 | 6.06 | 14.12 | 0.01 | 1.16 | 0.03 | 0.00 | 0.10 |
| 193 | 63.69 | 14.63 | 6.11 | 13.66 | 0.01 | 1.74 | 0.03 | 0.00 | 0.10 |
| 194 | 63.18 | 14.85 | 6.12 | 13.30 | 0.01 | 2.40 | 0.03 | 0.00 | 0.10 |
| 195 | 62.96 | 14.99 | 6.07 | 12.81 | 0.01 | 3.00 | 0.04 | 0.00 | 0.10 |
| 196 | 62.45 | 15.23 | 6.12 | 12.39 | 0.01 | 3.65 | 0.04 | 0.00 | 0.10 |
| 197 | 64.71 | 13.76 | 5.38 | 13.15 | 0.01 | 2.84 | 0.03 | 0.00 | 0.10 |
| 198 | 64.69 | 13.89 | 5.11 | 12.45 | 0.01 | 3.64 | 0.09 | 0.00 | 0.10 |
| 199 | 64.28 | 15.09 | 4.22 | 12.25 | 0.01 | 3.98 | 0.06 | 0.00 | 0.10 |
| 200 | 66.15 | 13.07 | 4.63 | 14.40 | 0.01 | 1.60 | 0.03 | 0.00 | 0.09 |
| 201 | 66.10 | 13.09 | 5.61 | 13.44 | 0.01 | 1.61 | 0.04 | 0.00 | 0.09 |
| 202 | 65.30 | 14.01 | 4.68 | 14.27 | 0.01 | 1.60 | 0.04 | 0.00 | 0.09 |
| 203 | 66.24 | 13.08 | 4.68 | 13.31 | 0.01 | 2.53 | 0.04 | 0.00 | 0.09 |
| 204 | 66.37 | 13.03 | 4.64 | 13.24 | 0.01 | 1.62 | 0.98 | 0.00 | 0.09 |
| 205 | 67.21 | 13.02 | 4.68 | 13.31 | 0.01 | 1.59 | 0.07 | 0.00 | 0.09 |
| 206 | 65.48 | 14.02 | 5.54 | 13.22 | 0.01 | 1.59 | 0.05 | 0.00 | 0.09 |
| 207 | 66.18 | 14.02 | 4.69 | 14.35 | 0.01 | 0.61 | 0.04 | 0.00 | 0.09 |
| 208 | 66.25 | 14.04 | 5.66 | 13.33 | 0.01 | 0.59 | 0.03 | 0.00 | 0.09 |
| 209 | 66.22 | 14.03 | 3.69 | 14.34 | 0.01 | 1.59 | 0.04 | 0.00 | 0.09 |
| 210 | 65.25 | 14.06 | 4.67 | 13.27 | 0.01 | 2.60 | 0.04 | 0.00 | 0.09 |
| 211 | 65.25 | 14.07 | 4.66 | 13.35 | 0.01 | 1.58 | 0.99 | 0.00 | 0.09 |
| 212 | 66.22 | 14.14 | 4.58 | 13.32 | 0.01 | 1.58 | 0.04 | 0.00 | 0.09 |
| 213 | 66.29 | 14.17 | 4.56 | 13.29 | 0.01 | 0.62 | 0.97 | 0.00 | 0.09 |
| 214 | 67.18 | 14.16 | 4.58 | 13.31 | 0.01 | 0.59 | 0.07 | 0.00 | 0.09 |
| 215 | 66.22 | 14.18 | 5.49 | 12.39 | 0.01 | 1.57 | 0.05 | 0.00 | 0.09 |
| 216 | 66.26 | 14.10 | 3.66 | 13.24 | 0.01 | 2.58 | 0.05 | 0.00 | 0.09 |
| 217 | 66.40 | 14.11 | 3.58 | 13.24 | 0.01 | 1.61 | 0.96 | 0.00 | 0.09 |
| 218 | 67.25 | 14.03 | 3.71 | 13.28 | 0.01 | 1.58 | 0.05 | 0.00 | 0.09 |
| 219 | 65.12 | 15.00 | 4.71 | 13.37 | 0.01 | 1.65 | 0.04 | 0.00 | 0.09 |
| 220 | 66.19 | 14.01 | 4.71 | 12.35 | 0.01 | 2.60 | 0.04 | 0.00 | 0.09 |
| 221 | 66.24 | 14.00 | 4.74 | 12.33 | 0.01 | 1.58 | 1.01 | 0.00 | 0.09 |
| 222 | 66.19 | 15.02 | 4.67 | 13.36 | 0.01 | 0.61 | 0.04 | 0.00 | 0.09 |
| 223 | 67.19 | 14.01 | 4.65 | 12.40 | 0.01 | 1.61 | 0.04 | 0.00 | 0.09 |
| 224 | 66.22 | 15.01 | 3.71 | 13.32 | 0.01 | 1.59 | 0.04 | 0.00 | 0.09 |
| 225 | 66.08 | 15.01 | 4.68 | 12.48 | 0.01 | 1.60 | 0.05 | 0.00 | 0.09 |
| 226 | 66.11 | 14.05 | 4.23 | 13.25 | 0.02 | 2.21 | 0.03 | 0.00 | 0.09 |
| 227 | 66.22 | 13.71 | 4.63 | 13.27 | 0.02 | 2.01 | 0.03 | 0.00 | 0.09 |
| 228 | 66.15 | 13.49 | 4.71 | 13.01 | 0.02 | 2.50 | 0.03 | 0.00 | 0.09 |
| 229 | 66.97 | 13.58 | 4.58 | 13.09 | 0.02 | 1.64 | 0.03 | 0.00 | 0.09 |
| 230 | 66.40 | 13.63 | 4.52 | 13.31 | 0.02 | 1.98 | 0.03 | 0.00 | 0.09 |
| 231 | 64.91 | 13.69 | 4.94 | 13.51 | 0.01 | 2.81 | 0.04 | 0.00 | 0.08 |

TABLE 1-continued

| | Composition (mol %) | | | | | | | | |
|---|---|---|---|---|---|---|---|---|---|
| Example | SiO$_2$ | Al$_2$O$_3$ | B$_2$O$_3$ | Na$_2$O | K$_2$O | MgO | CaO | ZnO | SnO$_2$ |
| 232 | 64.97 | 13.42 | 5.00 | 14.04 | 0.01 | 2.42 | 0.04 | 0.00 | 0.08 |
| 233 | 65.08 | 13.47 | 5.12 | 13.96 | 0.01 | 1.85 | 0.41 | 0.00 | 0.08 |
| 234 | 65.38 | 13.32 | 4.84 | 13.87 | 0.01 | 2.44 | 0.04 | 0.00 | 0.08 |
| 235 | 65.36 | 13.44 | 4.99 | 13.78 | 0.01 | 2.01 | 0.32 | 0.00 | 0.08 |

TABLE 2

| Example | Strain Temp. °C. | Anneal Temp. °C. | Soft Temp. °C. | CTE 10$^7$/°C. | Density g/cm$^3$ | Poisson Ratio | Shear Modulus (Mpsi) | Young's Modulus (Mpsi) | SOC Nm/MPa/cm | Index |
|---|---|---|---|---|---|---|---|---|---|---|
| 1 | 547.00 | 599.00 | 857.00 | 76.40 | 2.39 | 0.22 | 3.98 | 9.71 | | |
| 2 | 549.00 | 601.00 | 861.00 | 76.60 | 2.39 | 0.22 | 4.03 | 9.84 | | |
| 3 | 551.00 | 603.00 | 858.00 | 75.80 | 2.39 | 0.23 | 4.01 | 9.88 | | |
| 4 | 552.00 | 603.00 | 853.00 | 75.40 | 2.39 | 0.22 | 4.05 | 9.89 | | |
| 5 | 562.00 | 616.00 | 879.00 | 74.30 | 2.39 | 0.23 | 4.02 | 9.85 | | |
| 6 | 569.00 | 624.00 | 895.00 | 71.20 | 2.38 | 0.22 | 4.01 | 9.80 | | |
| 7 | 550.00 | 603.00 | | 77.00 | 2.39 | 0.22 | 3.99 | 9.75 | | |
| 8 | 553.00 | 606.00 | | 76.70 | 2.39 | 0.22 | 4.02 | 9.82 | | |
| 9 | 554.00 | 607.00 | | 76.80 | 2.40 | 0.22 | 4.05 | 9.90 | 32.75 | |
| 10 | 561.00 | 613.00 | | 74.70 | 2.40 | 0.22 | 4.08 | 9.96 | 32.79 | |
| 11 | 550.00 | 600.00 | | 74.70 | 2.41 | 0.22 | 4.13 | 10.07 | 32.44 | |
| 12 | 564.00 | 615.00 | 851.00 | 97.20 | 2.44 | 0.24 | 3.95 | 9.79 | 33.19 | |
| 13 | 556.00 | 604.00 | 835.00 | 81.90 | 2.41 | 0.21 | 4.09 | 9.93 | 32.30 | |
| 14 | 557.00 | 604.00 | 835.00 | 84.60 | 2.41 | 0.23 | 4.07 | 10.01 | 32.36 | |
| 15 | 555.00 | 604.00 | 836.00 | 81.90 | 2.41 | 0.22 | 4.08 | 9.93 | 32.33 | |
| 16 | 554.00 | 602.00 | 838.00 | 84.10 | 2.41 | 0.22 | 4.09 | 9.96 | 32.19 | |
| 17 | 554.00 | 602.00 | 836.00 | 81.10 | 2.41 | 0.22 | 4.09 | 9.99 | 32.12 | |
| 18 | 567.00 | 617.00 | 860.00 | 91.20 | 2.43 | 0.22 | 4.03 | 9.84 | | 1.50 |
| 19 | 567.00 | 617.00 | 861.00 | 92.80 | 2.43 | 0.24 | 4.03 | 9.96 | | |
| 20 | 562.00 | 614.00 | 875.00 | 80.80 | 2.38 | 0.23 | 3.90 | 9.55 | 32.94 | |
| 21 | 553.00 | 601.00 | 840.00 | 79.40 | 2.39 | 0.22 | 3.96 | 9.68 | 32.88 | |
| 22 | 572.00 | 625.00 | 893.00 | 79.60 | 2.39 | 0.23 | 3.94 | 9.65 | 33.02 | |
| 23 | 576.00 | 631.00 | 913.00 | 74.90 | 2.37 | 0.22 | 3.85 | 9.43 | 34.56 | |
| 24 | 574.00 | 630.00 | 906.00 | 75.70 | 2.37 | 0.22 | 3.83 | 9.31 | 34.12 | |
| 25 | 544.00 | 590.00 | 818.00 | 79.90 | 2.40 | 0.23 | 3.98 | 9.75 | 32.29 | |
| 26 | 555.00 | 606.00 | 861.00 | 79.50 | 2.40 | 0.22 | 3.90 | 9.50 | 33.12 | |
| 27 | 550.00 | 598.00 | 824.00 | 80.60 | 2.41 | 0.22 | 3.97 | 9.70 | 32.38 | |
| 28 | 568.00 | 623.00 | 890.00 | 79.80 | 2.40 | 0.21 | 3.95 | 9.58 | 32.85 | |
| 29 | 569.00 | 624.00 | 907.00 | 75.30 | 2.39 | 0.23 | 3.85 | 9.46 | 34.36 | |
| 30 | 571.00 | 627.00 | 895.00 | 76.00 | 2.38 | 0.22 | 3.81 | 9.32 | 34.21 | |
| 31 | 539.00 | 585.00 | 806.00 | 79.10 | 2.43 | 0.22 | 4.01 | 9.80 | 32.96 | |
| 32 | 579.00 | 633.00 | 904.00 | 75.50 | 2.38 | 0.22 | 3.93 | 9.55 | | |
| 33 | 581.00 | 635.00 | 906.00 | 76.70 | 2.38 | 0.22 | 3.94 | 9.61 | 33.22 | |
| 34 | 581.00 | 637.00 | 906.00 | 77.60 | 2.39 | 0.22 | 3.95 | 9.66 | 33.33 | |
| 35 | 584.00 | 639.00 | 913.00 | 76.60 | 2.38 | 0.23 | 3.92 | 9.65 | 33.74 | |
| 36 | 586.00 | 641.00 | 915.00 | 76.40 | 2.38 | 0.22 | 3.91 | 9.56 | 33.43 | |
| 37 | 584.00 | 639.00 | 911.00 | 77.70 | 2.39 | 0.21 | 3.98 | 9.61 | 33.13 | |
| 38 | 584.00 | 638.00 | 907.00 | 78.50 | 2.39 | 0.21 | 4.01 | 9.70 | 32.84 | |
| 39 | 570.00 | 623.00 | 890.00 | 80.40 | 2.38 | 0.22 | 3.89 | 9.46 | 33.85 | |
| 40 | 572.00 | 626.00 | 889.00 | 79.40 | 2.39 | 0.21 | 3.96 | 9.58 | 33.34 | |
| 41 | 577.00 | 632.00 | 895.00 | 79.00 | 2.40 | 0.20 | 4.01 | 9.61 | 33.02 | |
| 42 | 581.00 | 634.00 | 902.00 | 79.70 | 2.40 | 0.21 | 4.04 | 9.78 | 32.62 | |
| 43 | 588.00 | 640.00 | 899.00 | 78.20 | 2.41 | 0.21 | 4.09 | 9.89 | 32.28 | |
| 44 | 596.00 | 653.00 | 929.00 | 76.00 | 2.38 | 0.23 | 3.91 | 9.59 | 33.92 | |
| 45 | 598.00 | 654.00 | 926.00 | 76.80 | 2.39 | 0.22 | 3.98 | 9.66 | 33.59 | |
| 46 | 598.00 | 652.00 | 922.00 | 76.70 | 2.40 | 0.22 | 4.03 | 9.86 | 32.92 | |
| 47 | 602.00 | 656.00 | 917.00 | 76.70 | 2.40 | 0.22 | 4.09 | 10.00 | 32.42 | |
| 48 | 608.00 | 662.00 | 926.00 | 77.00 | 2.41 | 0.22 | 4.14 | 10.08 | 32.24 | |
| 49 | 617.00 | 674.00 | 948.00 | 67.10 | 2.38 | 0.21 | 4.06 | 9.86 | 33.31 | |
| 50 | 611.00 | 668.00 | 942.00 | 70.20 | 2.38 | 0.20 | 4.06 | 9.76 | 33.39 | |
| 51 | 604.00 | 661.00 | 939.00 | 71.20 | 2.38 | 0.21 | 4.04 | 9.80 | 33.41 | |
| 52 | 597.00 | 654.00 | 927.00 | 73.20 | 2.38 | 0.20 | 4.04 | 9.70 | 33.28 | |
| 53 | 585.00 | 639.00 | 909.00 | 75.90 | 2.39 | 0.22 | 4.03 | 9.80 | 33.24 | |
| 54 | 587.00 | 642.00 | 911.00 | 75.00 | 2.39 | 0.22 | 4.01 | 9.76 | 33.28 | |
| 55 | 578.00 | 632.00 | 906.00 | 76.60 | 2.38 | 0.22 | 3.90 | 9.54 | | |
| 56 | 583.00 | 637.00 | 899.00 | 74.70 | 2.39 | 0.23 | 3.96 | 9.75 | | |
| 57 | 591.00 | 643.00 | 905.00 | 72.20 | 2.39 | 0.24 | 4.04 | 9.98 | | |
| 58 | 600.00 | 651.00 | 907.00 | 71.00 | 2.40 | 0.22 | 4.12 | 10.10 | | |
| 59 | 612.00 | 664.00 | 913.00 | 68.30 | 2.41 | 0.23 | 4.21 | 10.36 | 33.10 | |
| 60 | 589.00 | 644.00 | 918.00 | 77.20 | 2.39 | 0.21 | 3.99 | 9.68 | 33.31 | |
| 61 | 594.00 | 649.00 | 928.00 | 75.10 | 2.39 | 0.21 | 4.12 | 10.01 | 33.31 | |
| 62 | 597.00 | 653.00 | 928.00 | 72.30 | 2.39 | 0.22 | 4.03 | 9.84 | 33.25 | |

TABLE 2-continued

| Example | Strain Temp. ° C. | Anneal Temp. ° C. | Soft Temp. ° C. | CTE 10⁷/° C. | Density g/cm³ | Poisson Ratio | Shear Modulus (Mpsi) | Young's Modulus (Mpsi) | SOC Nm/MPa/cm | Index |
|---|---|---|---|---|---|---|---|---|---|---|
| 63 | 604.00 | 659.00 | 925.00 | 69.10 | 2.39 | 0.22 | 4.09 | 9.93 | 33.10 | |
| 64 | 608.00 | 663.00 | 932.00 | 66.70 | 2.39 | 0.22 | 4.13 | 10.03 | 32.97 | |
| 65 | 610.00 | 664.00 | 929.00 | 74.90 | 2.41 | 0.23 | 4.14 | 10.17 | 32.00 | |
| 66 | 617.00 | 670.00 | 932.00 | 74.00 | 2.41 | 0.21 | 4.22 | 10.22 | 31.55 | |
| 67 | 622.00 | 675.00 | 931.00 | 73.40 | 2.42 | 0.23 | 4.24 | 10.39 | 31.18 | |
| 68 | 618.00 | 674.00 | 952.00 | 70.60 | 2.39 | 0.21 | 4.14 | 10.02 | 32.50 | |
| 69 | 610.00 | 665.00 | 935.00 | 71.20 | 2.39 | 0.20 | 4.14 | 9.97 | 32.34 | |
| 70 | 604.00 | 660.00 | 942.00 | 73.90 | 2.39 | 0.21 | 4.12 | 9.95 | 32.35 | |
| 71 | 625.00 | 678.00 | 934.00 | 88.70 | 2.44 | 0.23 | 4.02 | 9.86 | 31.52 | |
| 72 | 607.00 | 661.00 | 917.00 | 86.80 | 2.43 | 0.22 | 4.10 | 10.01 | 32.15 | |
| 73 | 580.08 | 631.38 | | | | | | | 31.00 | 1.50 |
| 74 | 576.82 | 629.34 | 889.00 | 76.90 | 2.40 | 0.21 | 4.15 | 10.09 | 31.71 | 1.50 |
| 75 | 573.78 | 626.59 | | | | | | | 32.58 | 1.50 |
| 76 | 572.63 | 627.27 | 901.00 | 75.30 | 2.39 | 0.20 | 4.04 | 9.74 | 32.71 | 1.50 |
| 77 | 572.78 | 626.22 | | | | | | | 32.76 | 1.50 |
| 78 | 574.46 | 627.88 | 899.00 | 77.70 | 2.39 | 0.21 | 4.03 | 9.76 | 32.74 | 1.50 |
| 79 | 574.58 | 627.75 | | | | | | | 32.80 | 1.50 |
| 80 | 572.77 | 627.01 | | | | | | | 32.71 | 1.50 |
| 81 | 572.77 | 625.03 | 894.00 | 78.40 | | 0.21 | 4.05 | 9.84 | 32.38 | 1.50 |
| 82 | 579.14 | 632.02 | | | | | | | 32.05 | 1.50 |
| 83 | 579.97 | 633.54 | 898.00 | 83.90 | 2.41 | 0.21 | 4.11 | 9.98 | 31.66 | 1.50 |
| 84 | 578.65 | 630.79 | | | | | | | 31.60 | 1.50 |
| 85 | 579.00 | 630.96 | 892.00 | 79.50 | 2.41 | 0.23 | 4.12 | 10.08 | 31.55 | 1.50 |
| 86 | 582.01 | 634.39 | | | | | | | 31.73 | 1.50 |
| 87 | 590.44 | 643.85 | 907.00 | 77.00 | 2.41 | 0.22 | 4.17 | 10.13 | 31.74 | 1.50 |
| 88 | 592.31 | 644.34 | | | | | | | 31.69 | 1.50 |
| 89 | 593.32 | 645.42 | 908.00 | 76.40 | 2.41 | 0.22 | 4.17 | 10.20 | 31.62 | 1.50 |
| 90 | 594.07 | 646.84 | | | | | | | 31.54 | 1.50 |
| 91 | 595.47 | 647.25 | 910.00 | 75.30 | | 0.22 | 4.17 | 10.21 | 31.69 | 1.50 |
| 92 | 590.61 | 642.96 | | | | | | | 31.80 | 1.50 |
| 93 | 587.43 | 641.27 | 905.00 | 76.70 | | 0.22 | 4.14 | 10.07 | 31.83 | 1.50 |
| 94 | 586.33 | 637.77 | | | | | | | 31.80 | 1.50 |
| 95 | 583.86 | 637.16 | 905.00 | 80.80 | 2.40 | 0.22 | 4.12 | 10.06 | 31.86 | 1.50 |
| 96 | 584.97 | 636.80 | | | | | | | 31.93 | 1.50 |
| 97 | 584.51 | 637.50 | 903.00 | 78.20 | 2.40 | 0.22 | 4.12 | 10.04 | 31.91 | 1.50 |
| 98 | 584.85 | 638.33 | | | | | | | 31.84 | 1.50 |
| 99 | 586.03 | 638.95 | 906.00 | 76.60 | 2.40 | 0.22 | 4.11 | 10.01 | 32.17 | 1.50 |
| 100 | 586.73 | 639.81 | | | | | | | 32.07 | 1.50 |
| 101 | 588.13 | 641.64 | 918.00 | 74.20 | 2.39 | 0.22 | 4.12 | 10.06 | 32.06 | 1.50 |
| 102 | 587.27 | 642.07 | | | | | | | 32.24 | 1.50 |
| 103 | 587.96 | 642.38 | 918.00 | 75.00 | 2.39 | 0.21 | 4.13 | 10.04 | 31.99 | 1.50 |
| 104 | 589.93 | 643.39 | | | | | | | 31.92 | 1.50 |
| 105 | 594.53 | 645.58 | 906.00 | 74.90 | | 0.22 | 4.22 | 10.28 | 31.48 | 1.50 |
| 106 | 593.15 | 644.26 | | | | | | | 31.47 | 1.50 |
| 107 | 595.52 | 647.83 | 904.00 | 74.50 | | 0.22 | 4.23 | 10.31 | 31.39 | 1.50 |
| 108 | 596.61 | 647.80 | | | | | | | 31.33 | 1.50 |
| 109 | 592.71 | 644.07 | 898.00 | 72.50 | 2.41 | 0.22 | 4.19 | 10.24 | 31.62 | 1.50 |
| 110 | 574.10 | 625.87 | | | | | | | 32.09 | 1.50 |
| 111 | 570.20 | 620.84 | 878.00 | 74.60 | 2.39 | 0.22 | 4.05 | 9.87 | 32.66 | 1.50 |
| 112 | 561.15 | 612.90 | | | | | | | 33.05 | 1.50 |
| 113 | 554.29 | 605.84 | 863.00 | 76.00 | 2.39 | 0.22 | 3.98 | 9.75 | 33.12 | 1.50 |
| 114 | 556.94 | 608.90 | | | | | | | 33.14 | 1.50 |
| 115 | 560.75 | 613.25 | 875.00 | 76.80 | 2.39 | 0.22 | 3.99 | 9.75 | 33.13 | 1.50 |
| 116 | 577.46 | 632.00 | | | | | | | 33.02 | 1.50 |
| 117 | 599.20 | 654.90 | 936.00 | 70.10 | 2.38 | 0.21 | 4.11 | 9.97 | 32.76 | 1.50 |
| 118 | 612.67 | 671.07 | | | | | | | 32.51 | 1.50 |
| 119 | 611.82 | 669.75 | 961.00 | 69.40 | | 0.21 | 4.15 | 10.08 | 32.53 | 1.50 |
| 120 | 612.46 | 669.34 | | | | | | | 32.44 | 1.50 |
| 121 | 612.34 | 669.02 | 960.00 | 67.80 | | 0.21 | 4.15 | 10.06 | 32.43 | 1.50 |
| 122 | 604.89 | 660.49 | | | | | | | 31.98 | 1.50 |
| 123 | 598.90 | 651.49 | 910.00 | 72.10 | 2.40 | 0.22 | 4.20 | 10.22 | 31.44 | 1.50 |
| 124 | 592.71 | 645.16 | | | | | | | 31.34 | 1.50 |
| 125 | 594.81 | 645.48 | 900.00 | 74.90 | 2.41 | 0.22 | 4.22 | 10.28 | 31.20 | 1.50 |
| 126 | 593.88 | 645.41 | | | | | | | 31.30 | 1.50 |
| 127 | 594.88 | 645.00 | 898.00 | 74.80 | 2.41 | 0.22 | 4.21 | 10.30 | 31.31 | 1.50 |
| 128 | 589.78 | 641.21 | | | | | | | 31.51 | 1.50 |
| 129 | 585.85 | 637.68 | 899.00 | 77.10 | 2.41 | 0.22 | 4.17 | 10.15 | 31.62 | 1.50 |
| 130 | 576.15 | 628.11 | | | | | | | 31.55 | 1.50 |
| 131 | 573.87 | 626.53 | 884.00 | 78.80 | 2.41 | 0.22 | 4.12 | 10.03 | 31.60 | 1.50 |
| 132 | 573.74 | 625.75 | | | | | | | 31.63 | 1.50 |
| 133 | 573.86 | 626.45 | 891.00 | 79.20 | | 0.21 | 4.10 | 9.92 | 31.67 | 1.50 |
| 134 | 583.13 | 636.73 | | | | | | | 31.70 | 1.50 |
| 135 | 596.84 | 651.92 | 930.00 | 74.40 | | 0.22 | 4.12 | 10.05 | 32.02 | 1.50 |
| 136 | 610.10 | 666.35 | | | | | | | 32.29 | 1.50 |
| 137 | 609.97 | 667.32 | 961.40 | 72.00 | 2.39 | 0.21 | 4.16 | 10.04 | 32.25 | 1.50 |
| 138 | 611.32 | 668.10 | | | | | | | 32.26 | 1.50 |

TABLE 2-continued

| Example | Strain Temp. ° C. | Anneal Temp. ° C. | Soft Temp. ° C. | CTE 10⁷/° C. | Density g/cm³ | Poisson Ratio | Shear Modulus (Mpsi) | Young's Modulus (Mpsi) | SOC Nm/ MPa/cm | Index |
|---|---|---|---|---|---|---|---|---|---|---|
| 139 | 612.19 | 668.82 | 953.60 | 72.60 | 2.39 | 0.22 | 4.13 | 10.09 | 32.37 | 1.50 |
| 140 | 606.25 | 662.25 | | | | | | | 32.26 | 1.50 |
| 141 | 600.40 | 655.38 | 929.00 | 74.30 | 2.39 | 0.22 | 4.14 | 10.09 | 32.04 | 1.50 |
| 142 | 595.66 | 650.87 | | | | | | | 31.97 | 1.50 |
| 143 | 596.11 | 649.79 | 921.00 | 73.80 | 2.40 | 0.21 | 4.14 | 10.06 | 31.97 | 1.50 |
| 144 | 596.28 | 650.47 | | | | | | | 31.86 | 1.50 |
| 145 | 593.81 | 649.65 | 921.00 | 75.40 | 2.40 | 0.21 | 4.14 | 10.06 | 32.02 | 1.50 |
| 146 | 590.62 | 643.87 | | | | | | | 32.17 | 1.50 |
| 147 | 581.32 | 634.79 | 908.00 | 79.50 | | 0.21 | 4.07 | 9.88 | 32.37 | 1.50 |
| 148 | 571.71 | 625.90 | | | | | | | 32.40 | 1.50 |
| 149 | 567.79 | 620.85 | 885.00 | 84.80 | | 0.22 | 3.97 | 9.70 | 32.85 | 1.50 |
| 150 | 573.74 | 628.25 | | | | | | | 33.09 | 1.50 |
| 151 | 566.28 | 619.08 | 879.00 | 89.10 | 2.40 | 0.22 | 3.93 | 9.61 | 33.12 | 1.50 |
| 152 | 549.70 | 603.30 | 878.40 | | 2.38 | | | | 33.38 | |
| 153 | 557.10 | 610.80 | | | | | | | 32.81 | |
| 154 | 561.10 | 614.60 | 887.10 | | 2.38 | | | | 32.76 | |
| 155 | 559.30 | 614.10 | 899.70 | 75.80 | 2.38 | | | | 33.13 | |
| 156 | 555.50 | 606.70 | | | 2.38 | 0.21 | 3.99 | 9.62 | 32.85 | 1.50 |
| 157 | 558.40 | 611.50 | | | | | | | 33.40 | 1.50 |
| 158 | 552.80 | 617.80 | | | 2.38 | 0.21 | 3.96 | 9.59 | 33.41 | 1.50 |
| 159 | 564.80 | 618.70 | | | | | | | 33.51 | 1.50 |
| 160 | 565.80 | 620.30 | 894.10 | 75.60 | 2.38 | 0.21 | 3.98 | 9.62 | 33.44 | 1.50 |
| 161 | 565.40 | 621.70 | | | | | | | 33.38 | 1.50 |
| 162 | 566.60 | 621.10 | | | 2.38 | 0.21 | 3.98 | 9.65 | 33.35 | 1.50 |
| 163 | 574.00 | 628.90 | | | | | | | 33.30 | 1.50 |
| 164 | 587.80 | 644.50 | | | 2.38 | 0.21 | 4.06 | 9.81 | 32.72 | 1.50 |
| 165 | 587.90 | 644.80 | | | | | | | 32.71 | 1.50 |
| 166 | 586.50 | 642.70 | 932.10 | 75.20 | 2.39 | 0.22 | 4.05 | 9.85 | 32.74 | 1.50 |
| 167 | 586.60 | 643.30 | | | | | | | 32.83 | 1.50 |
| 168 | 579.20 | 634.60 | | | 2.39 | 0.20 | 4.04 | 9.72 | 32.80 | 1.50 |
| 169 | 574.20 | 628.50 | | | | | | | 32.76 | 1.50 |
| 170 | 567.10 | 619.80 | | | 2.39 | 0.21 | 4.04 | 9.81 | 32.68 | 1.50 |
| 171 | 567.60 | 620.60 | | | | | | | 32.63 | 1.50 |
| 172 | 565.70 | 618.50 | | 75.50 | 2.39 | 0.22 | 4.04 | 9.85 | 32.75 | 1.50 |
| 173 | 563.80 | 615.70 | | | 2.39 | 0.22 | 4.04 | 9.86 | 32.56 | 1.50 |
| 174 | 560.80 | 612.00 | | | | | | | 32.47 | 1.50 |
| 175 | 556.40 | 606.70 | 869.10 | 77.50 | 2.39 | 0.21 | 4.07 | 9.86 | 32.36 | 1.50 |
| 176 | 556.40 | 606.30 | | | | | | | 32.20 | 1.50 |
| 177 | 558.40 | 608.90 | 855.10 | | 2.40 | 0.21 | 4.10 | 9.94 | 32.13 | 1.50 |
| 178 | 557.10 | 607.70 | | | | | | | 32.40 | 1.50 |
| 179 | 561.60 | 613.00 | | 76.60 | 2.39 | 0.21 | 4.07 | 9.84 | 32.48 | 1.50 |
| 180 | 566.60 | 619.70 | | | | | | | 32.66 | 1.50 |
| 181 | 569.00 | 622.10 | | | 2.39 | 0.22 | 4.08 | 9.92 | 32.67 | 1.50 |
| 182 | 573.00 | 626.00 | | | | | | | 32.69 | 1.50 |
| 183 | 574.40 | 628.20 | | | 2.39 | 0.21 | 4.09 | 9.91 | 32.72 | 1.50 |
| 184 | 572.70 | 626.10 | | | 2.39 | 0.21 | 4.06 | 9.82 | 32.87 | 1.50 |
| 185 | 574.60 | 628.90 | | | | | | | 32.67 | 1.50 |
| 186 | 576.90 | 630.10 | | | | | | | 32.75 | 1.50 |
| 187 | 575.50 | 628.60 | 900.00 | | 2.39 | 0.22 | 4.05 | 9.85 | 32.78 | 1.50 |
| 188 | 577.10 | 631.30 | | | | | | | 32.80 | 1.50 |
| 189 | 580.70 | 634.20 | 916.30 | 71.90 | 2.39 | 0.23 | 4.06 | 9.95 | 32.73 | 1.50 |
| 190 | 587.40 | 641.50 | 919.50 | 73.00 | 2.40 | 0.22 | 4.08 | 9.99 | 32.66 | 1.50 |
| 191 | 566.10 | 619.40 | 899.30 | 78.30 | 2.39 | 0.22 | 3.94 | 9.62 | 33.60 | 1.50 |
| 192 | 569.10 | 623.40 | 909.10 | 76.30 | 2.39 | 0.22 | 3.96 | 9.65 | 33.48 | 1.50 |
| 193 | 576.70 | 632.10 | 909.20 | 74.20 | 2.39 | 0.22 | 4.00 | 9.74 | 33.25 | 1.50 |
| 194 | 582.40 | 635.50 | 907.00 | 71.60 | 2.40 | 0.25 | 4.02 | 10.06 | 33.08 | 1.50 |
| 195 | 586.20 | 639.40 | 906.00 | 68.80 | 2.40 | 0.23 | 4.08 | 10.05 | 32.62 | 1.50 |
| 196 | 590.30 | 643.30 | 904.40 | 67.50 | 2.40 | 0.22 | 4.14 | 10.10 | 32.51 | 1.50 |
| 197 | 582.30 | 634.70 | 907.90 | 74.30 | 2.40 | 0.22 | 4.09 | 9.96 | 32.66 | 1.50 |
| 198 | 586.80 | 639.60 | 907.10 | 69.40 | 2.40 | 0.22 | 4.14 | 10.11 | 32.40 | 1.50 |
| 199 | 613.20 | 667.20 | 931.80 | 66.10 | 2.41 | 0.22 | 4.27 | 10.42 | 31.65 | 1.50 |
| 200 | 559.70 | 610.40 | 869.40 | 76.90 | 2.40 | 0.22 | 4.09 | 9.95 | 32.06 | 1.50 |
| 201 | 566.10 | 619.40 | 884.90 | 73.00 | 2.39 | 0.21 | 4.00 | 9.68 | 33.11 | 1.50 |
| 202 | 571.40 | 625.10 | 899.10 | 78.00 | 2.40 | 0.21 | 4.05 | 9.81 | 32.37 | 1.50 |
| 203 | 571.60 | 624.80 | 895.80 | 75.50 | 2.40 | 0.22 | 4.09 | 9.96 | 32.42 | 1.50 |
| 204 | 563.10 | 615.00 | 881.30 | 76.20 | 2.40 | 0.22 | 4.13 | 10.03 | 32.06 | 1.50 |
| 205 | 575.10 | 630.50 | 907.80 | | 2.39 | 0.20 | 4.06 | 9.73 | 32.80 | 1.50 |
| 206 | 576.90 | 632.60 | 909.80 | | 2.39 | 0.22 | 3.98 | 9.73 | 33.32 | 1.50 |
| 207 | 575.20 | 631.90 | 921.50 | | 2.39 | 0.21 | 4.01 | 9.71 | 32.89 | 1.50 |
| 208 | 583.80 | 641.90 | 933.30 | 73.20 | 2.38 | 0.22 | 3.92 | 9.60 | 33.87 | 1.49 |
| 209 | 587.80 | 644.10 | 926.20 | 77.80 | 2.40 | 0.20 | 4.11 | 9.87 | 32.09 | 1.50 |
| 210 | 583.20 | 637.90 | 908.80 | 72.80 | 2.40 | 0.21 | 4.08 | 9.87 | 32.46 | 1.50 |
| 211 | 578.50 | 631.10 | 901.50 | | 2.41 | | | | 32.20 | 1.50 |
| 212 | 591.10 | 648.60 | | | 2.39 | | | | 32.95 | 1.50 |
| 213 | 589.30 | 646.10 | | | 2.40 | | | | 32.64 | 1.50 |
| 214 | 603.90 | 663.10 | | | 2.38 | | | | 33.31 | 1.50 |

TABLE 2-continued

| Example | Strain Temp. °C. | Anneal Temp. °C. | Soft Temp. °C. | CTE $10^7$/°C. | Density g/cm$^3$ | Poisson Ratio | Shear Modulus (Mpsi) | Young's Modulus (Mpsi) | SOC Nm/ MPa/cm | Index |
|---|---|---|---|---|---|---|---|---|---|---|
| 215 | 591.30 | 649.00 | | | 2.38 | | | | 33.59 | 1.50 |
| 216 | 599.90 | 656.10 | | | 2.40 | | | | 32.00 | 1.50 |
| 217 | 595.80 | 650.30 | | | 2.41 | | | | 31.81 | 1.50 |
| 218 | 607.10 | 663.90 | 954.60 | | | 0.22 | 4.08 | 9.96 | 32.54 | 1.50 |
| 219 | 602.50 | 658.70 | 943.60 | | | 0.22 | 4.07 | 9.93 | 32.81 | 1.50 |
| 220 | 595.50 | 652.10 | 930.90 | | | 0.22 | 0.41 | 10.02 | 32.72 | 1.50 |
| 221 | 593.90 | 648.90 | 927.00 | | | 0.22 | 4.11 | 10.00 | 32.56 | 1.50 |
| 222 | 608.10 | 667.60 | 962.80 | | | 0.22 | 4.02 | 9.78 | 33.18 | 1.50 |
| 223 | 600.70 | 659.20 | 954.00 | | | 0.21 | 4.06 | 9.86 | 33.19 | 1.50 |
| 224 | 615.70 | 673.30 | | | | | | | 32.13 | 1.50 |
| 225 | 609.80 | 666.40 | 951.30 | | | 0.21 | 4.11 | 9.97 | 32.82 | 1.50 |
| 226 | 595.00 | 650.50 | 938.30 | 74.40 | 2.40 | 0.21 | 4.12 | 10.00 | 32.55 | 1.50 |
| 227 | 586.80 | 643.10 | 930.30 | 75.10 | 2.39 | 0.21 | 4.08 | 9.92 | 32.56 | 1.50 |
| 228 | 587.10 | 641.50 | 925.20 | 72.70 | 2.39 | 0.21 | 4.10 | 9.95 | 32.73 | 1.50 |
| 229 | 591.20 | 647.70 | 944.30 | 72.60 | 2.39 | 0.21 | 4.08 | 9.83 | 32.84 | 1.50 |
| 230 | 590.40 | 647.70 | 951.00 | 74.10 | 2.38 | 0.21 | 4.05 | 9.81 | 33.11 | 1.50 |
| 231 | 576.00 | 630.00 | 898.60 | 73.90 | 2.40 | 0.22 | 4.07 | 9.89 | 32.49 | 1.50 |
| 232 | 569.00 | 621.00 | 883.80 | 76.20 | 2.40 | 0.22 | 4.06 | 9.91 | 32.39 | 1.50 |
| 233 | 564.00 | 616.00 | 883.50 | 76.20 | 2.40 | 0.21 | 4.07 | 9.90 | 32.28 | 1.50 |
| 234 | 577.00 | 630.00 | 898.00 | 75.70 | 2.40 | 0.22 | 4.09 | 9.96 | 32.32 | 1.50 |
| 235 | 572.00 | 624.00 | 898.70 | 75.50 | 2.40 | 0.21 | 4.08 | 9.91 | 32.34 | 1.50 |

TABLE 3

| Example | CS (MPa) | DOL (microns) | Indentation Threshold (kgf) |
|---|---|---|---|
| 1 | | 49.4 | 37.5 |
| 2 | | 48.0 | 37.5 |
| 3 | | 49.3 | 37.5 |
| 4 | | 46.9 | 37.5 |
| 5 | | 49.0 | 37.5 |
| 6 | | 47.6 | 37.5 |
| 7 | | 53.0 | 37.5 |
| 8 | | 52.5 | 37.5 |
| 9 | 730.4 | 49.6 | 37.5 |
| 10 | 710.6 | 51.0 | 37.5 |
| 11 | 735.7 | 44.0 | 37.5 |
| 12 | 977.8 | 49.2 | 12.5 |
| 13 | 760.8 | 47.0 | 22.5 |
| 14 | 761.6 | 46.9 | 32.5 |
| 15 | 771.8 | 44.9 | 27.5 |
| 16 | 778.6 | 42.7 | 27.5 |
| 17 | 792.0 | 42.6 | 32.5 |
| 18 | | | 12.5 |
| 19 | | | 12.5 |
| 20 | 773.9 | 49.7 | 42.5 |
| 21 | 734.0 | 45.3 | 35 |
| 22 | 799.5 | 53.6 | 40 |
| 23 | 728.9 | 51.1 | 35 |
| 24 | 757.3 | 52.7 | 42.5 |
| 25 | 711.6 | 38.0 | 35 |
| 26 | 758.3 | 50.1 | 32.5 |
| 27 | 721.0 | 45.3 | 30 |
| 28 | 782.0 | 54.7 | 32.5 |
| 29 | 725.5 | 53.1 | 32.5 |
| 30 | 752.3 | 53.3 | 27.5 |
| 31 | 699.0 | 39.2 | 17.5 |
| 32 | | 59.0 | 17.5 |
| 33 | 767.1 | 61.1 | 32.5 |
| 34 | 766.0 | 61.3 | 37.5 |
| 35 | 764.0 | 60.8 | 40 |
| 36 | 764.7 | 62.0 | 32.5 |
| 37 | 778.9 | 62.0 | 40 |
| 38 | 784.0 | 62.4 | 27.5 |
| 39 | 718.8 | 56.7 | 32.5 |
| 40 | 734.0 | 54.0 | 37.5 |
| 41 | 762.2 | 52.6 | 42.5 |
| 42 | 776.8 | 51.6 | 35 |
| 43 | 794.9 | 50.4 | 35 |
| 44 | 773.2 | 54.7 | 32.5 |
| 45 | 795.8 | 52.5 | 37.5 |
| 46 | 829.9 | 47.9 | 47.5 |
| 47 | 854.5 | 48.4 | 42.5 |
| 48 | 868.2 | 46.7 | 40 |
| 49 | 754.8 | 46.1 | 37.5 |
| 50 | 762.4 | 48.3 | 42.5 |
| 51 | 762.7 | 50.7 | 42.5 |
| 52 | 772.0 | 51.6 | 35 |
| 53 | 764.5 | 51.3 | 40 |
| 54 | 766.8 | 51.6 | 40 |
| 55 | | 52.6 | 47.5 |
| 56 | | 52.9 | 42.5 |
| 57 | | 42.1 | 32.5 |
| 58 | | 38.0 | 32.5 |
| 59 | | 34.2 | 27.5 |
| 60 | 789.7 | 56.8 | 50 |
| 61 | 788.9 | 54.5 | 42.5 |
| 62 | 779.9 | 49.9 | 32.5 |
| 63 | 763.9 | 44.6 | 32.5 |
| 64 | 740.5 | 40.0 | 35 |
| 65 | 877.8 | 47.2 | 22.5 |
| 66 | 894.7 | 44.9 | 22.5 |
| 67 | 911.3 | 43.6 | 17.5 |
| 68 | 808.2 | 47.6 | 22.5 |
| 69 | 815.3 | 49.4 | 22.5 |
| 70 | 811.2 | 50.4 | 22.5 |
| 71 | 1097.4 | 59.3 | 15 |
| 72 | 1030.8 | 56.6 | >25 |
| 73 | 851.5 | 44.5 | 12.5 |
| 74 | 846.2 | 43.2 | 17.5 |
| 75 | 826.1 | 44.3 | 27.5 |
| 76 | 823.1 | 44.8 | 32.5 |
| 77 | 827.4 | 44.5 | 30 |
| 78 | 846.9 | 44.6 | 27.5 |
| 79 | 837.1 | 43.2 | 42.5 |
| 80 | 833.1 | 44.0 | 37.5 |
| 81 | 839.9 | 43.2 | 22.5 |
| 82 | 870.4 | 45.8 | 17.5 |
| 83 | 895.2 | 46.4 | 17.5 |
| 84 | 894.0 | 46.7 | 17.5 |
| 85 | 892.9 | 46.7 | 12.5 |
| 86 | 887.9 | 45.2 | 12.5 |
| 87 | 886.9 | 42.9 | 12.5 |
| 88 | 884.3 | 42.5 | 22.5 |
| 89 | 886.8 | 40.8 | 22.5 |
| 90 | 868.0 | 41.8 | 22.5 |
| 91 | 877.3 | 40.8 | 12.5 |
| 92 | 864.6 | 42.3 | 22.5 |

TABLE 3-continued

| Example | CS (MPa) | DOL (microns) | Indentation Threshold (kgf) |
|---|---|---|---|
| 93 | 871.9 | 43.4 | 22.5 |
| 94 | 875.0 | 44.6 | 17.5 |
| 95 | 868.3 | 45.1 | 12.5 |
| 96 | 867.5 | 44.9 | 17.5 |
| 97 | 867.0 | 44.8 | 12.5 |
| 98 | 860.8 | 45.2 | 22.5 |
| 99 | 837.8 | 45.5 | 17.5 |
| 100 | 823.4 | 46.4 | 20 |
| 101 | 820.1 | 46.7 | 22.5 |
| 102 | 812.5 | 47.3 | 22.5 |
| 103 | 844.0 | 45.0 | 17.5 |
| 104 | 835.2 | 41.7 | 17.5 |
| 105 | 846.6 | 42.9 | 22.5 |
| 106 | 846.9 | 38.4 | 17.5 |
| 107 | 850.3 | 37.8 | 17.5 |
| 108 | 857.6 | 38.2 | 12.5 |
| 109 | 845.8 | 38.5 | 17.5 |
| 110 | 817.2 | 37.6 | 22.5 |
| 111 | 793.0 | 39.3 | 30 |
| 112 | 778.9 | 39.6 | 27.5 |
| 113 | 767.8 | 38.0 | 27.5 |
| 114 | 770.6 | 39.3 | 17.5 |
| 115 | 766.0 | 39.9 | 27.5 |
| 116 | 795.9 | 42.0 | 27.5 |
| 117 | 798.8 | 45.1 | 27.5 |
| 118 | 791.5 | 46.5 | 32.5 |
| 119 | 794.2 | 46.1 | 32.5 |
| 120 | 798.7 | 46.3 | 27.5 |
| 121 | 801.4 | 46.2 | 32.5 |
| 122 | 838.2 | 43.1 | 25 |
| 123 | 870.8 | 40.0 | 22.5 |
| 124 | 886.9 | 37.2 | 12.5 |
| 125 | 896.6 | 37.7 | 12.5 |
| 126 | 892.6 | 36.9 | 12.5 |
| 127 | 891.2 | 37.2 | 17.5 |
| 128 | 888.5 | 39.3 | 12.5 |
| 129 | 880.8 | 42.1 | 17.5 |
| 130 | 855.8 | 44.7 | 12.5 |
| 131 | 849.4 | 45.2 | 12.5 |
| 132 | 860.3 | 44.7 | 12.5 |
| 133 | 851.2 | 45.1 | 17.5 |
| 134 | 864.4 | 47.0 | 12.5 |
| 135 | 873.9 | 48.0 | 17.5 |
| 136 | 840.3 | 48.3 | 22.5 |
| 137 | 842.2 | 47.3 | 32.5 |
| 138 | 839.3 | 47.0 | 37.5 |
| 139 | 836.8 | 47.3 | 32.5 |
| 140 | 843.5 | 46.8 | 27.5 |
| 141 | 853.2 | 47.1 | 27.5 |
| 142 | 855.9 | 46.1 | 27.5 |
| 143 | 865.4 | 44.9 | 22.5 |
| 144 | 868.6 | 45.1 | 27.5 |
| 145 | 866.0 | 45.9 | 27.5 |
| 146 | 873.0 | 46.3 | 32.5 |
| 147 | 891.7 | 46.8 | 27.5 |
| 148 | 894.5 | 48.5 | 37.5 |
| 149 | 869.8 | 51.7 | 37.5 |
| 150 | 903.8 | 55.3 | 42.5 |
| 151 | 853.8 | 54.5 | 37.5 |
| 152 | 712.8 | 51.3 | 37.5 |
| 153 | 739.3 | 48.9 | 32.5 |
| 154 | 711.8 | 47.7 | 32.5 |
| 155 | 741.1 | 52.7 | 37.5 |
| 156 | | | 32.5 |
| 157 | | | 22.5 |
| 158 | | | 22.5 |
| 159 | | | 32.5 |
| 160 | | | 32.5 |
| 161 | | | 27.5 |
| 162 | | | 32.5 |
| 163 | | | 37.5 |
| 164 | | | 42.5 |
| 165 | | | 37.5 |
| 166 | | | 37.5 |
| 167 | | | 42.5 |
| 168 | | | 32.5 |
| 169 | | | 37.5 |
| 170 | | | 32.5 |
| 171 | | | 27.5 |
| 172 | | | 37.5 |
| 173 | | | 27.5 |
| 174 | | | 32.5 |
| 175 | | | 22.5 |
| 176 | | | 12.5 |
| 177 | | | 22.5 |
| 178 | | | 17.5 |
| 179 | | | 27.5 |
| 180 | | | 22.5 |
| 181 | | | 45 |
| 182 | | | 42.5 |
| 183 | | | 47.5 |
| 184 | | | 42.5 |
| 185 | | | 37.5 |
| 186 | | | 42.5 |
| 187 | | | 37.5 |
| 188 | | | 37.5 |

Table 4 compares physical properties of the glasses described herein, labeled Glass 2 and having the composition 64.65 mol % $SiO_2$, 13.93 mol % $Al_2O_3$, 5.11 mol % $B_2O_3$, 13.75 mol % $Na_2O$, 0 mol % $K_2O$, 2.38 mol % MgO, 0.14 mol % CaO, and 0.08 mol % $SnO_2$, with those properties of Glass 1, which has the composition 68.84 mol % $SiO_2$, 10.63 mol % $Al_2O_3$, 0 mol % $B_2O_3$, 14.86 mol % $Na_2O$, 0.02 mol % $K_2O$, 5.43 mol % MgO, 0.04 mol % CaO, and 0.17 mol % $SnO_2$, and is described in U.S. patent application Ser. No. 13/533,298, by Matthew J. Dejneka et al., entitled "Ion Exchangeable Glass With High Compressive Stress," which claims priority from U.S. Provisional Patent Application No. 61/503,734, filed on Jul. 1, 2011 and having the same title; and Glass 2, which has the composition 67.45 mol % $SiO_2$, 12.69 mol % $Al_2O_3$, 3.67 mol % $B_2O_3$, 13.67 mol % $Na_2O$, 0.02 mol % $K_2O$, 2.36 mol % MgO, 0.03 mol % CaO, and 0.09 mol % $SnO_2$, and is described in U.S. Provisional Patent Application No. 61/653,489, filed on May 31, 2012, by Matthew J. Dejneka et al., entitled "Zircon Compatible, Ion Exchangeable Glass With High Damage Resistance," and U.S. Provisional Patent Application No. 61/748,981, filed on Jan. 4, 2013, by Matthew J. Dejneka et al., and having the same title.

TABLE 4

| Glass | 1 | 2 | 3 |
|---|---|---|---|
| Anneal Point (° C.) | 650 | 629 | 644 |
| Strain Point (° C.) | 601 | 576 | 589 |
| Softening Point (° C.) | 891.7 | 900 | 922.4 |
| Density (g/cm³) | 2.432 | 2.39 | 2.403 |
| Poisson's Ratio | 0.205 | 0.216 | 0.213 |
| Shear Modulus (Mpsi) | 4.287 | 4.051 | 4.142 |
| Young's Modulus (Mpsi) | 10.336 | 9.851 | 10.046 |
| Liquidus Temperature (° C.) | 1020 | 1000 | 1005 |
| Liquidus Viscosity (kPoise) | 1000 | 1850 | 2210 |
| Primary Devit Phase | Forsterite | Nepheline | Forsterite |
| Zircon Breakdown Temperature (° C.) | 1200 | 1183 | 1230 |
| Zircon Breakdown Viscosity (kPoise) | 30.4 | 71.4 | 33.4 |
| 200 Poise Temperature (° C.) | 1665 | 1679 | 1757 |
| 35k Poise Temperature (° C.): | 1190 | 1226 | 1227 |
| Refractive Index | 1.50030 | 1.49844 | 1.49836 |
| SOC (nm/MPa/cm) | 29.64 | 32.78 | 31.94 |

The glasses described herein are resistant to both chipping and scratching, making it well suited for use in cover plates, touch screens, watch crystals, solar concentrators, windows, screens, containers, and other applications that require strong and tough glass with good scratch resistance.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass comprising:
   a. at least about 50 mol % $SiO_2$;
   b. at least about 10 mol % $R_2O$, wherein $R_2O$ comprises at least about 10 mol % $Na_2O$;
   c. from 12 mol % to about 22 mol % $Al_2O_3$, wherein $-1.61$ mol % $\leq Al_2O_3$(mol %)$-R_2O$(mol %)$\geq 2$ mol %;
   d. from greater than 0 mol % up to 5 mol % $B_2O_3$, wherein $B_2O_3$(mol %)$-(R_2O$(mol %)$-Al_2O_3$(mol %))$\geq 4.5$ mol %; and
   e. at least 0.1 mol % of at least one of MgO and ZnO, wherein the glass is ion exchangeable.

2. The glass of claim 1, wherein the glass comprises: at least about 50 mol % $SiO_2$, from 12 mol % to about 22 mol % $Al_2O_3$; from about 4.5 mol % to 5 mol % $B_2O_3$; from about 10 mol % to about 20 mol % $Na_2O$; from 0 mol % to about 5 mol % $K_2O$; at least about 0.1 mol % of at least one of MgO, ZnO, or combinations thereof, wherein 0 mol % $\leq$ MgO $\leq 6$ and $0 \leq$ ZnO $\leq 6$ mol %; and, optionally, at least one of CaO, BaO, and SrO, wherein 0 mol % $\leq$ CaO+SrO+BaO $\leq 2$ mol %.

3. The glass of claim 2, wherein the glass comprises from about 60 to 66 mol % $SiO_2$.

4. The glass of claim 1, wherein the glass comprises greater than 4.5 mol % $B_2O_3$ in which boron cations are three-fold coordinated.

5. The glass of claim 1, wherein the glass is ion exchanged and has a layer under a compressive stress of at least about 600 MPa, the layer extending from a surface of the glass into the glass to a depth of layer of at least about 30 μm.

6. The glass of claim 5, wherein the compressive stress is at least about 800 MPa.

7. The glass of claim 5, wherein the glass has a Vickers crack initiation threshold of at least about 30 kgf.

8. A glass comprising: at least about 50 mol % $SiO_2$; at least about 10 mol % $R_2O$, wherein $R_2O$ comprises at least about 10 mol % $Na_2O$; from 12 mol % to about 22 mol % $Al_2O_3$; greater than about 2.5 mol % to 5 mol % $B_2O_3$; and at least 0.1 mol % of at least one of MgO and ZnO, wherein $B_2O_3$(mol %)$-(R_2O$(mol %)$-Al_2O_3$(mol %))$\geq 4.5$ mol %, wherein the glass has a zircon breakdown temperature at which the viscosity of the glass is greater than about 40 kPoise.

9. The glass of claim 8, wherein the glass comprises: at least about 50 mol % $SiO_2$, from 12 mol % to about 22 mol % $Al_2O_3$; from about 4.5 mol % to 5 mol % $B_2O_3$; from about 10 mol % to about 20 mol % $Na_2O$; from 0 mol % to about 5 mol % $K_2O$; at least about 0.1 mol % of at least one of MgO and ZnO, wherein 0 mol % $\leq$ MgO $\leq 6$ and $0 \leq$ ZnO $\leq 6$ mol %; and, optionally, at least one of CaO, BaO, and SrO, wherein 0 mol % $\leq$ CaO+SrO+BaO $\leq 2$ mol %.

10. The glass of claim 9, wherein the glass comprises from about 60 to about 66 mol % $SiO_2$.

11. The glass of claim 8, wherein the glass comprises greater than about 4.5 mol % $B_2O_3$ in which boron cations are three-fold coordinated.

12. The glass of claim 9, wherein the glass is ion exchanged and has a layer under a compressive stress of at least about 600 MPa, the layer extending from a surface of the glass into the glass to a depth of layer of at least about 30 μm.

13. The glass of claim 12, wherein the compressive stress is at least about 800 MPa.

14. The glass of claim 12, wherein the glass has a Vickers crack initiation threshold of at least about 30 kgf.

15. A glass, wherein the glass is ion exchanged and has a Vickers crack initiation threshold of at least about 30 kgf, the glass comprising:
   a. at least about 60 mol % $SiO_2$;
   b. at least about 10 mol % $R_2O$, wherein $R_2O$ comprises at least about 10 mol % $Na_2O$;
   c. from 12 mol % to about 22 mol % $Al_2O_3$, wherein $-1.61$ mol % $\leq Al_2O_3$(mol %)$-R_2O$(mol %)$\leq 2$ mol %;
   d. from greater than 0 mol % up to 5 mol % $B_2O_3$, wherein $B_2O_3$(mol %)$-(R_2O$(mol %)$-Al_2O_3$(mol %))$\geq 4.5$ mol %; and
   e. at least 0.1 mol % of at least one of MgO and ZnO, wherein the glass is ion exchangeable.

16. The glass of claim 15, wherein the glass comprises: at least about 50 mol % $SiO_2$, from 12 mol % to about 22 mol % $Al_2O_3$; from about 4.5 mol % to 5 mol % $B_2O_3$; from about 10 mol % to about 20 mol % $Na_2O$; from 0 mol % to about 5 mol % $K_2O$; at least about 0.1 mol % of at least one of MgO and ZnO, wherein 0 mol % $\leq$ MgO $\leq 6$ and $0 \leq$ ZnO $\leq 6$ mol %; and, optionally, at least one of CaO, BaO, and SrO, wherein 0 mol % $\leq$ CaO+SrO+BaO $\leq 2$ mol %.

17. The glass of claim 16, wherein the glass comprises from about 60 to 66 mol % $SiO_2$.

18. The glass of claim 15, wherein the glass comprises greater than about 4.5 mol % $B_2O_3$ in which boron cations are three-fold coordinated.

19. The glass of claim 15, wherein the glass has a layer under a compressive stress of at least about 600 MPa, the layer extending from a surface of the glass into the glass to a depth of layer of at least about 30 μm.

20. The glass of claim 19, wherein the compressive stress is at least about 800 MPa.

21. The glass of claim 15, wherein the Vickers crack initiation threshold is in a range from about 30 kgf to about 35 kgf.

* * * * *